(12) United States Patent
Lapidous

(10) Patent No.: US 10,541,976 B2
(45) Date of Patent: *Jan. 21, 2020

(54) SECURE COMMUNICATIONS WITH INTERNET-ENABLED DEVICES

(71) Applicant: AnchorFree Inc., Redwood City, CA (US)

(72) Inventor: Eugene Lapidous, Saratoga, CA (US)

(73) Assignee: Pango Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,865

(22) Filed: Oct. 16, 2018

(65) Prior Publication Data
US 2019/0052606 A1 Feb. 14, 2019

Related U.S. Application Data

(63) Continuation of application No. 15/040,762, filed on Feb. 10, 2016, now Pat. No. 10,135,792, and a
(Continued)

(51) Int. Cl.
*H04L 29/06* (2006.01)
*H04L 12/46* (2006.01)
(Continued)

(52) U.S. Cl.
CPC ...... *H04L 63/0281* (2013.01); *H04L 12/4633* (2013.01); *H04L 12/4641* (2013.01);
(Continued)

(58) Field of Classification Search
CPC ............. H04L 12/4633; H04L 12/4641; H04L 63/0227; H04L 63/0272; H04L 63/029;
(Continued)

(56) References Cited

U.S. PATENT DOCUMENTS 7,305,546 B1 * 12/2007 Miller .................. H04L 63/029
713/153
8,145,788 B1 * 3/2012 Love .................. H04L 61/1511
709/217
(Continued)

*Primary Examiner* — Joseph P Hirl
*Assistant Examiner* — Stephen T Gundry
(74) *Attorney, Agent, or Firm* — David R. Stevens; Stevens Law Group

(57) ABSTRACT

A network device allows inbound connections from external addresses to a computer on a local network while forbidding output connections from the computer to that external address unless preceded by an inbound connection therefrom. In some embodiments, the computer is allowed to accept inbound connections from external addresses but is not permitted to initiate outbound connections to other computers in the local network unless preceded by an inbound connection. In some embodiments, a request from an external address is processed by the network device by transmitting network information for the computer to the external address and temporarily changes network rules to allow connections from the external address. In some embodiments, if the computer attempts a disallowed connection, the connection attempt is routed through a proxy server by providing network data for the proxy server to the computer.

20 Claims, 12 Drawing Sheets

Related U.S. Application Data continuation of application No. 15/040,655, filed on Feb. 10, 2016, now Pat. No. 10,135,790, which is a continuation of application No. 15/040,697, filed on Feb. 10, 2016, now Pat. No. 10,135,791.

(60) Provisional application No. 62/209,776, filed on Aug. 25, 2015.

(51) Int. Cl.
*H04L 29/08* (2006.01)
*H04L 29/12* (2006.01)

(52) U.S. Cl.
CPC ........ *H04L 63/029* (2013.01); *H04L 63/0227* (2013.01); *H04L 63/0272* (2013.01); *H04L 63/10* (2013.01); *H04L 63/101* (2013.01); *H04L 63/20* (2013.01); *H04L 65/1069* (2013.01); *H04L 67/02* (2013.01); *H04L 61/1511* (2013.01); *H04L 61/2575* (2013.01); *H04L 63/1458* (2013.01)

(58) Field of Classification Search
CPC ....... H04L 63/10; H04L 63/101; H04L 63/20; H04L 65/1069; H04L 63/0281; H04L 61/1511; H04L 61/2575; H04L 63/1458; H04L 67/02

See application file for complete search history.

(56) References Cited

U.S. PATENT DOCUMENTS

| | | | | |
|---|---|---|---|---|
| 9,083,718 B1 * | 7/2015 | Bosak | ................ | H04L 67/1046 |
| 9,100,369 B1 * | 8/2015 | Fallows | .............. | H04L 63/0281 |
| 9,237,027 B2 * | 1/2016 | Ellard | ................... | H04L 12/24 |
| 9,288,225 B1 * | 3/2016 | Fei | ....................... | H04L 63/1441 |
| 9,608,962 B1 * | 3/2017 | Chang | ................ | H04L 63/0272 |
| 9,723,023 B2 * | 8/2017 | Ellard | .................... | H04L 63/20 |
| 9,723,069 B1 * | 8/2017 | Fallows | ............. | H04L 67/1036 |
| 9,756,135 B2 * | 9/2017 | Sama | ...................... | H04L 63/10 |
| 9,762,576 B2 * | 9/2017 | Dispensa | ........... | H04L 63/0869 |
| 2008/0155067 A1 * | 6/2008 | Rivera | ............... | H04L 63/0227 709/220 |
| 2008/0222715 A1 * | 9/2008 | Bansal | ............... | H04L 63/0263 726/11 |
| 2010/0037309 A1 | 2/2010 | Dargis | | |
| 2011/0258695 A1 * | 10/2011 | Barrett | .............. | G06Q 30/0269 726/13 |
| 2013/0081129 A1 * | 3/2013 | Niemela | .............. | G06F 21/566 726/11 |
| 2013/0179593 A1 * | 7/2013 | Dunlap | ................... | H04L 45/42 709/244 |
| 2014/0298415 A1 * | 10/2014 | Xie | ..................... | H04L 61/2589 726/3 |
| 2014/0310512 A1 * | 10/2014 | Sau | ....................... | H04W 76/10 713/151 |
| 2015/0229609 A1 | 8/2015 | Chien | | |
| 2015/0358285 A1 * | 12/2015 | Ellard | .................... | H04L 63/02 726/12 |
| 2016/0036920 A1 * | 2/2016 | Sama | ...................... | H04L 63/10 709/203 |
| 2016/0036921 A1 * | 2/2016 | Sama | ...................... | H04L 63/10 726/4 |
| 2016/0119211 A1 * | 4/2016 | King | .................. | H04L 61/2592 370/252 |
| 2016/0316021 A1 * | 10/2016 | Andersen | ................ | H04L 67/14 |
| 2017/0063940 A1 * | 3/2017 | Lapidous | ............ | H04L 63/0281 |
| 2017/0118217 A1 * | 4/2017 | Sama | ...................... | H04L 63/10 |

* cited by examiner

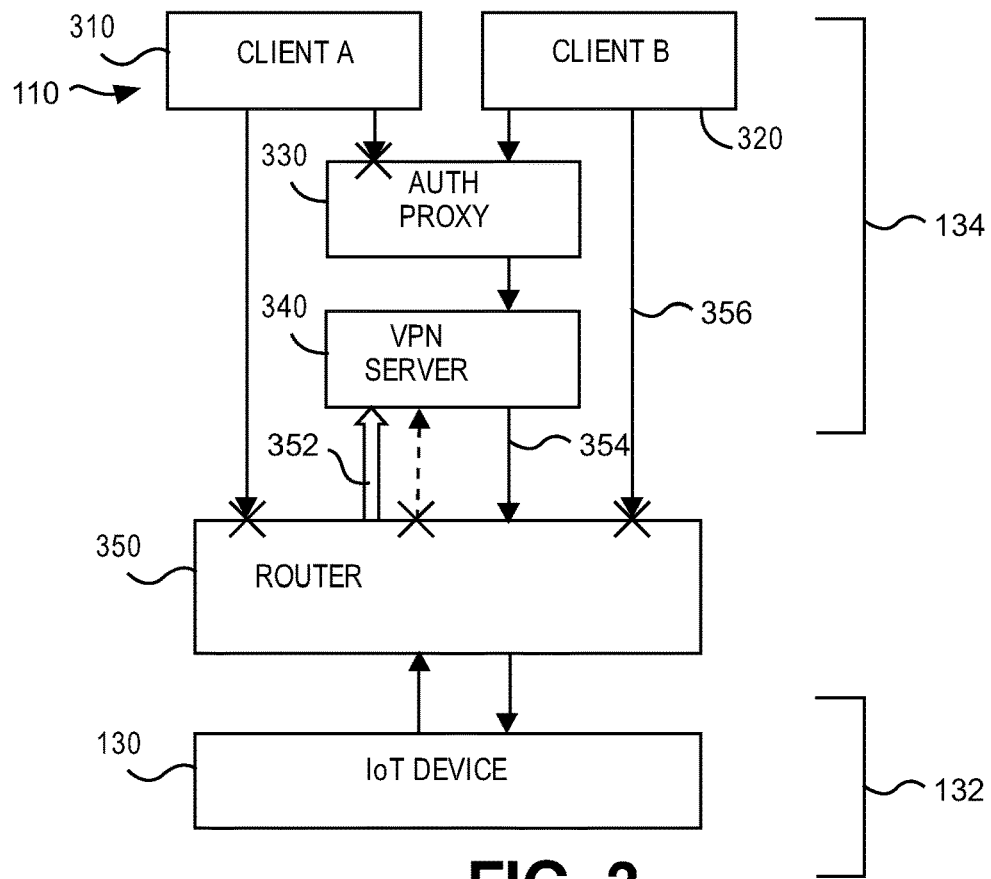
FIG. 3
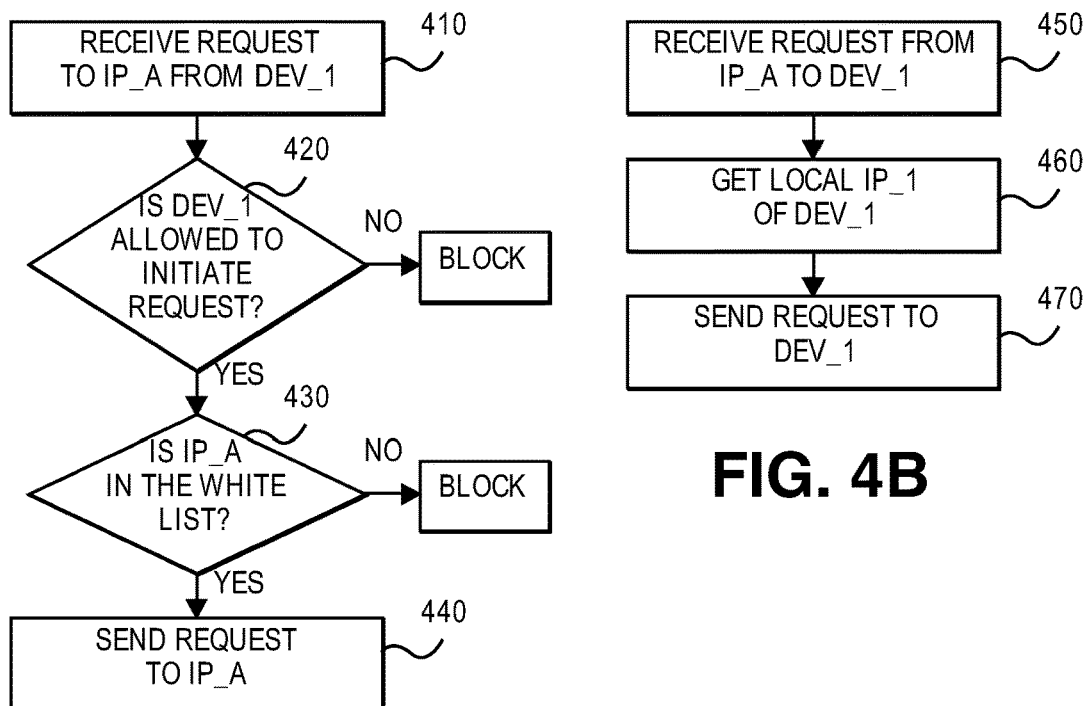
FIG. 4A
FIG. 4B

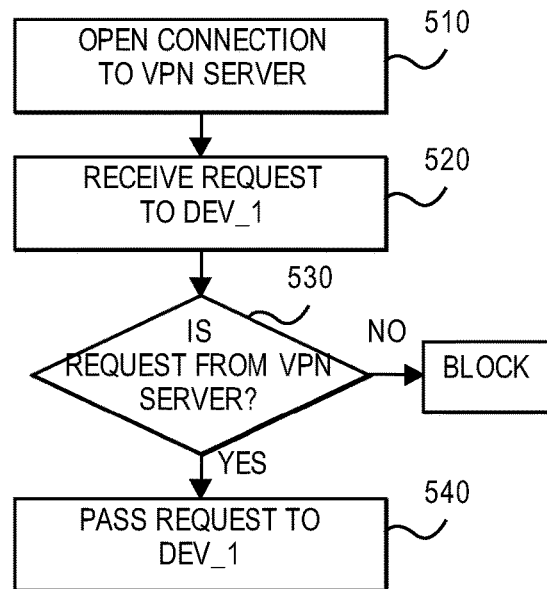
FIG. 5
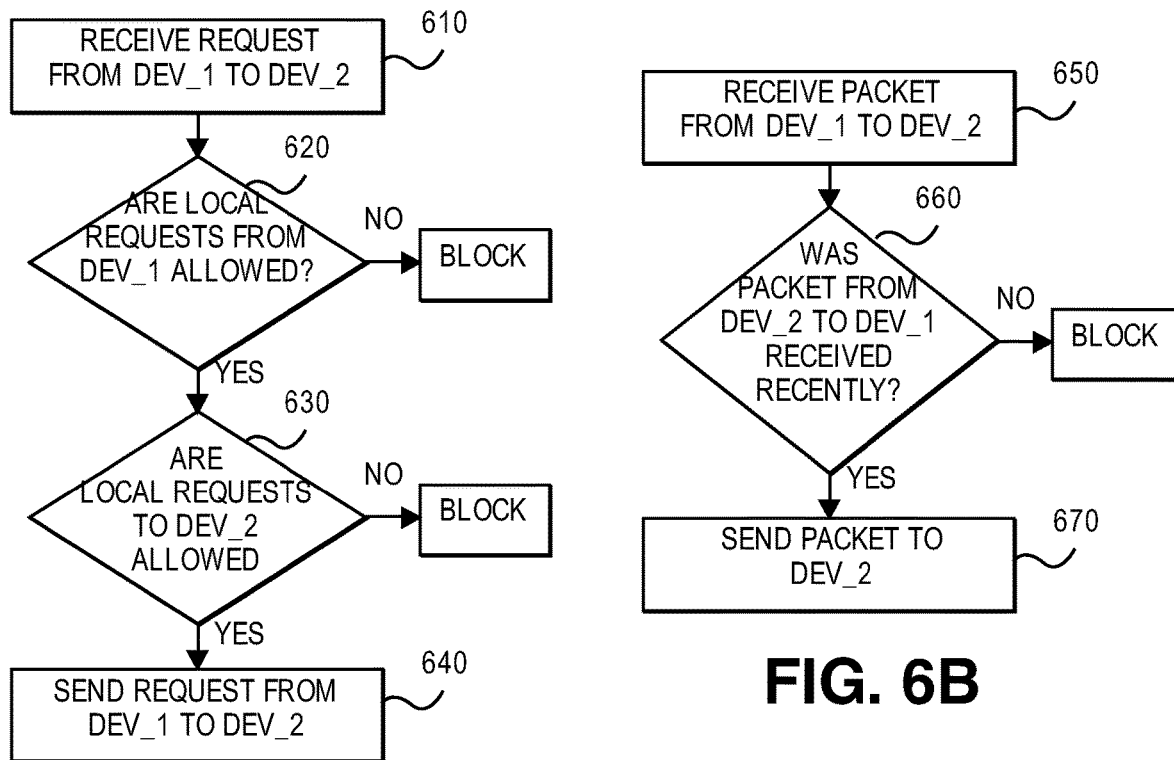
FIG. 6A
FIG. 6B

SECURE COMMUNICATIONS WITH INTERNET-ENABLED DEVICES

RELATED APPLICATIONS

This application is a continuation of U.S. application Ser. No. 15/040,762 filed Feb. 10, 2016, and entitled SECURE COMMUNICATIONS WITH INTERNET-ENABLED DEVICES, which claims the benefit of U.S. Provisional Application Ser. No. 62/209,776 filed Aug. 25, 2015 and entitled SYSTEM FOR SECURING CONNECTIONS BETWEEN COMPUTER DEVICES, both of which applications are hereby incorporated herein by reference in their entirety.

This application is also a continuation of the following applications that are also incorporated herein by reference in their entirety:

U.S. application Ser. No. 15/040,655 filed Feb. 10, 2016 and entitled SECURE COMMUNICATIONS WITH INTERNET-ENABLED DEVICES; and U.S. application Ser. No. 15/040,697 filed Feb. 10, 2016 and entitled SECURE COMMUNICATIONS WITH INTERNET-ENABLED DEVICES.

BACKGROUND

A rapidly growing number and variety of devices are acquiring an ability to connect to the Internet. Some examples of such devices are smart power switches, security cameras, illumination control devices, household appliances, network attached storage (NAS), and the like. These devices, often referred as Internet of Things (IoT), extend internet connectivity beyond traditional devices like desktop and laptop computers, smartphones and tablets to a diverse range of devices and everyday things that utilize embedded technology to communicate and interact with the external environment, all via the Internet.

Many of these devices are connected to the Internet through wireless (Wi-Fi) routers or access points, becoming parts of local networks. Usually, these devices are allowed to communicate both with devices on the same local network (for instance, wireless headphones), and with devices outside of the local network (for instance, mobile phones with vendor-specific applications providing remote access).

Such devices are often enabled to function both as HTTP/HTTPS clients, accessing remote servers for updates and to upload their data, and as HTTP/HTTPS servers, providing Application Programming Interfaces (APIs) that enable status control and data collection from other devices (IoT hubs, mobile phones, etc.).

The proliferation of connected devices with vendor-specific access patterns and security measures significantly increases security risks both inside and outside local networks. Rogue devices inside the local network may exploit vulnerabilities of other devices (for instance, Wi-Fi routers) to spy on network traffic, change DNS settings, access unauthorized data (for instance, shared directories on the local computers), or attack local devices (for instance, turn off smart switches, block security cameras etc.). Rogue devices capable of establishing connections with servers outside of the local networks may report data collected from local devices to unauthorized third parties, download malware to execute local attacks, or become parts of botnets capable of denial of service attacks or spam distribution.

With the increase in the number of device vendors and the variety of devices on the same network, it becomes more difficult to rely on individual vendors to control security. Even one compromised device inside the local network may present serious security and privacy threat.

Therefore, there is a need for solutions that would improve security of the systems comprised from untrusted devices connected to local networks. Preferably, such solutions should make connected devices more secure without degrading their usefulness and upgradeability, or incurring large additional costs.

SUMMARY OF THE INVENTION

In one aspect of the invention, a system includes a first computer and a second computer coupled to an external network. The first computer is programmed to receive a request forwarded from the second computer to provide one or more third network identifiers needed to establish a data exchange between the second computer and a third computer, the third computer being in the external network, the second computer having no record of the one or more third network identifiers. The first computer is further programed to evaluate whether the second computer is authorized to initiate direct inbound connections to the third computer. If the second computer is authorized to initiate direct inbound connections to the third computer, the first computer provides to the second computer the one or more third network identifiers.

If the second computer is not authorized to initiate direct inbound connections to the third computer, the first computer provide to the second computer, one or more fourth network identifiers corresponding to a fourth computer that is programmed to forward traffic between the second and third computers without transmitting the one or more third network identifiers to the second computer.

In some embodiments, the one or more third network identifiers are selected from the group consisting of a destination IP address and a destination port for the inbound connections to the third computer.

In some embodiments, the first computer is further programmed to evaluate whether the second computer is authorized to initiate direct inbound connection to the third computer by requesting the second computer to provide authorization credentials.

In some embodiments, the system further comprises a fourth computer, the fourth computer being further programmed to establish an outbound connection from the third computer to the fourth computer before providing the one or more fourth network identifiers of the fourth computer to the second computer, the outbound connection from the third computer to the fourth computer being a reverse connection to the third computer.

In some embodiments, the fourth computer is programmed to execute a virtual private network (VPN) server enabled to support reverse connections inside a VPN tunnel established from the third computer to the fourth computer.

In some embodiments, the second computer is programmed to, if the second computer is authorized to initiate direct inbound connections to the third computer, initiate the direct inbound connections to the third computer using interactive connectivity establishment (ICE) framework over user datagram protocol (UDP);

In some embodiments, the second computer is programmed to, if the second computer is not authorized to initiate direct inbound connections to the third computer, initiate a connection between the second computer and the fourth computer using hypertext transfer protocol (HTTP).

In some embodiments, the first computer is programmed to execute a domain name server (DNS) and to provide to the second computer with the at least one of the one or more third network identifiers and the one or more fourth network identifiers in response to a domain resolution request from the second computer.

In some embodiments, the third computer is a network-enabled home appliance.

In some embodiments, the third computer comprises at least one of a gateway, a router, a bridge, a switch and a firewall.

In some embodiments, a method includes providing a first computer and a second computer coupled to an external network. The method includes receiving, by the second computer, a request forwarded from the second computer to provide one or more third network identifiers needed to establish a data exchange between the second computer and a third computer, the third computer being in the external network, the second computer having no record of the one or more third network identifiers. The first computer evaluates whether the second computer is authorized to initiate direct inbound connections to the third computer. The first computer determines that the second computer is authorized to initiate direct inbound connections to the third computer, in response to determining that the second computer is authorized to initiate direct inbound connections to the third computer, providing the one or more third network identifiers to the second computer.

The method further comprises receiving, by the second computer, a request forwarded from the second computer to provide one or more fourth network identifiers needed to establish a data exchange between the second computer and a fourth computer, the fourth computer being in the external network, the second computer having no record of the one or more fourth network identifiers. The first computer evaluates whether the second computer is authorized to initiate direct inbound connections to the fourth computer. The first computer determines that the second computer is not authorized to initiate direct inbound connections to the fourth computer. In response to determining that the second computer is not authorized to initiate direct inbound connections to the fourth computer, the first computer provides to the second computer, one or more fifth network identifiers, the fifth network identifiers referencing a fifth computer, the fifth computer programmed to forward traffic between the second and fourth computers without transmitting the one or more fourth network identifiers to the second computer.

In some embodiments, the method further includes initiating a connection between the second computer and the fifth computer using hypertext transfer protocol (HTTP).

In some embodiments, the method includes establishing, by the fifth computer, an outbound connection from the fourth computer to the fifth computer before providing the one or more fifth network identifiers of the fifth computer to the second computer, the outbound connection from the fourth computer to the fifth computer being a reverse connection to the fourth computer.

In some embodiments, the fifth computer a virtual private network (VPN) server enabled to support reverse connections inside a VPN tunnel established from the fourth computer to the fifth computer.

In some embodiments, the one or more third network identifiers are selected from the group consisting of a destination IP address and a destination port for the inbound connections to the third computer.

In some embodiments, the method includes evaluating, by the first computer, whether the second computer is authorized to initiate direct inbound connection to the third computer by requesting the second computer to provide authorization credentials.

In some embodiments, in response to determining that the second computer is authorized to initiate direct inbound connections to the third computer, the method includes initiating, by the second computer, the direct inbound connections to the third computer using interactive connectivity establishment (ICE) framework over user datagram protocol (UDP).

In some embodiments the method includes executing on the first computer a domain name server (DNS). Providing, by the first computer, to the second computer the one or more third network identifiers may be performed in response to receiving a domain resolution request from the second computer.

In some embodiments, at least one of the third and the fourth computers is a network-enabled home appliance.

In some embodiments, at least one of the third and fourth computers comprises at least one of a gateway, a router, a bridge, a switch and a firewall.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings illustrate only typical embodiments of the invention and are not therefore to be considered limiting of its scope, the invention will be described and explained with additional specificity and detail through use of the accompanying drawings, in which:

FIG. 3 is a schematic block diagram of the network environment with connections between local devices and authorized remote computers through the VPN tunnel, managed in accordance with an embodiment of the present invention;

FIGS. 4A and 4B are process flow diagrams of a method of securing remote communications with device inside the local network in accordance with an embodiment of the present invention;

FIG. 5 is a process flow diagram of a method of securing remote communications with device inside the local network through a VPN tunnel, in accordance with an embodiment of the present invention;

FIGS. 6A and 6B are process flow diagrams of a method of managing communications between devices inside a local network in accordance with an embodiment of the present invention;

DETAILED DESCRIPTION

Figure 1:
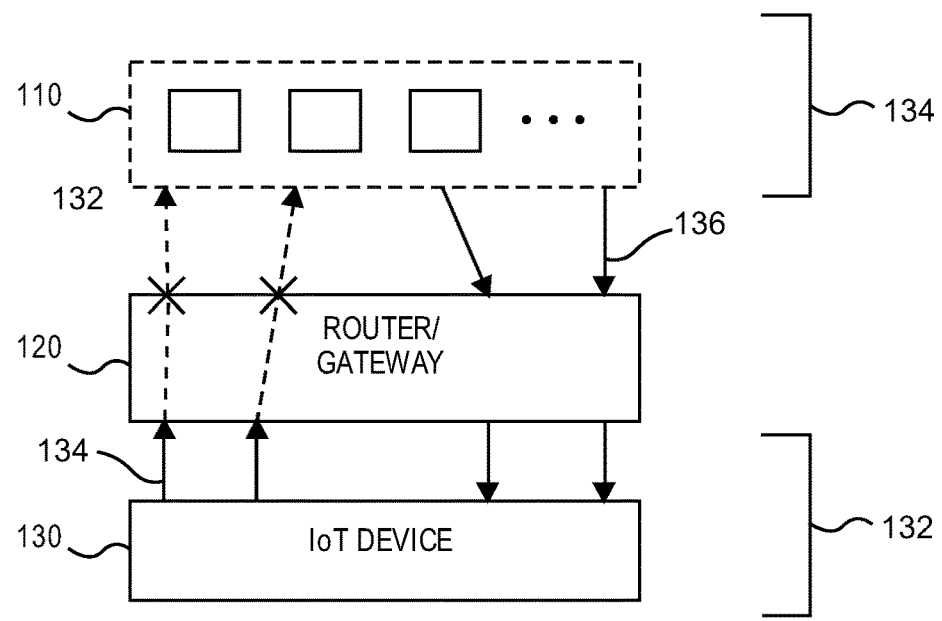
FIG. 1 is a schematic block diagram of the network environment with connections between local device and remote computers managed in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider). Computer networks may use transport protocols other than Internet Protocol. Correspondingly, present invention could be implemented for types of network addresses other than IP addresses.

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In one aspect of the invention, a system for managing remote communications with devices inside a local network is described. The system includes a first device connected to the local computer network, the device having means to initiate connections to external network addresses associated with devices outside of the local network, and to respond to connections initiated from external network addresses. The system further includes a second device having means to control data exchange between the first device and external network addresses.

The second device may further include means to block the first device from initiating connections to one or more external network addresses. The second device has means to accept connections initiated from one or more external network addresses and pass them to the first device. The second device may have means to block the first device from initiating requests to one or more of the same external network addresses that are allowed to initiate connections to the first device.

In one embodiment, the second device blocks at least one outbound connection of the outbound connections initiated by the first device, if the external address of the at least one outbound connection was not preceded by an inbound connection from the external address of the at least one outbound connection.

In some instances, the second device is further programmed to, for the at least one outbound connection, if the external address of the at least one outbound connection is preceded by an inbound connection from the external address of the at least one outbound connection, permitting the at least one outbound connection to the external address of the at least one outbound connection.

In another embodiment, the second device blocks all requests initiated by the first device except ones matching at least one network identifier from the list of allowed identifiers. Allowed network identifiers may include one or more from the group of domain name, IP address and port. In another embodiment, the second device blocks all connections to external network addresses initiated by the first device.

The first device may function both as a HTTP server and as a HTTP client, while the second device blocks connection attempts from the HTTP client to remote devices but allows connections from remote devices to reach the HTTP server.

In some embodiments, the second device may include at least one of a gateway, a router, a bridge, a switch and a firewall. In some embodiments, the second device's means to control data exchange between the first device and external network addresses includes a proxy server. For example, the proxy server may be programmed to accept connection request initiated from external network address. The proxy server further initiates a connection with the first device over the local network and passes request data to the first device. The proxy server receives a response from the first device over the local network and passes it to the external network address.

The proxy server may extract an identifier of the first device from the information submitted with the connection request, and then determine from a local network address of the device from requested identifier by using at least one of the Address Resolution Protocol (ARP), multicast Domain Name Service (mDNS) and Simple Service Discovery Protocol (SSDP).

In some embodiments, the system further includes a second device programmed to open one or more connections to intermediary computers located outside of the local network, the intermediary computers are enabled to accept connection requests from external network addresses and pass them to the second device. The second device further allows one or more connections from external network addresses if they are received through at least one connection opened by the second device to an intermediary computer. The second device may further be programmed to block any connections from external network addresses if they are received directly from the corresponding network address, in bypass of intermediary computers.

In some embodiments, the one or more intermediary computers are enabled to function as a proxy between the remote device and a second device, using reverse connection opened by the second device to pass requests from the remote device. In some embodiments, the one or more intermediary computers are enabled to function as VPN servers for connections from the second device, using reverse connection through the VPN tunnel opened by the second device to pass requests from the remote device. In some embodiments, a system for managing communications between devices inside a local network includes a first device having means to control traffic between a plurality of devices inside the local network. The plurality of devices inside the local network are enabled to initiate local connections with other devices on the same network and to respond to local connections from other devices on the same network. The first device is further programmed to block local connections initiated by one or more devices on the local network, while allowing one or more of these devices to respond to local connections initiated by other devices on the local network.

In some embodiments, the second device is programmed to accept at least one inbound connection from an external IP address, the connection from the external IP address including a reference to the first device. The second device is further programmed to, for at least one first outbound connection from the first device to a first address within the local network, if the at least one first outbound connection was not preceded by an inbound connection including a reference to the first device, blocking the at least one first outbound connection.

In some instances, the second device is further programmed to, for at least one second outbound connection from the first device to a second address within the local network, permit the at least one second outbound connection regardless of whether the at least one second outbound connection was preceded by an inbound connection to the first device including the second address.

In one other embodiment, first device applies different rules to the first and second group of devices on the local network, blocking connections from the first group to the second group, but allowing local connections from the second group to the first group. In one instance, local connections from one or more devices to at least one device are allowed, while local connections from the same one or more devices to at least one other device are blocked.

The first device may be, for example, a gateway, a router, a bridge, a switch, a proxy or a firewall. In some instance, the first device identifies other devices on the local network by information obtained from at least one of Address Resolution Protocol (ARP), multicast Domain Name Service (mDNS) and Simple Service Discovery Protocol (SSDP).

One or more devices on the local network that have connections to be blocked may be identified by their names or descriptions. In one example, at least one of these devices is specified by the user of the first device. The first device may block one or more local connections, for instance, by blocking at least one data packet from the device initiating the connection. In some instances, the first device blocks one or more local connections by blocking at least one data packet from the device responding to the connection initiated by the other device. In some embodiments, the first device identifies the device initiating the local connection by analyzing information about the packets previously sent or received by the same device, for instance by detecting that this device has sent a packet to the other device without previously receiving a packet from that device for at least pre-defined time interval.

In some embodiments, a system for managing direct connections to protected devices includes a first device connected to a computer network, the first being programmed to initiate connections to one or more devices connected to computer networks, and to determine whether to accept or reject connections initiated by one or more devices by using a set of rules available to the first device.

The system may further include second group of one or more devices connected to a computer network, at least one device in the second group being enabled to accept one or more connections initiated by the first device and to send data to the first device through at least one of these connections. The first device in such a system may be further programmed to initiate a connection to the device in the second group. The first device then receives through this connection information about one or more first identifiers of one or more connections to the first device expected to be initiated by a third device. The first device may be programmed to then change one or more rules to accept one or more connections associated with one or more first identifiers. The first device is further programmed to accept one or more connections from the third device having that includes the one or more first identifiers. Subsequently, upon detecting at least one pre-defined condition, the first device is programmed to change one or more rules to block one or more connections associated with one or more first identifiers.

In some instances, the first identifiers may include one or more parameters of expected connections from the set of source IP address, source port, transport protocol and data pattern. In some embodiments, the first device is connected to one or more devices inside the local network. In such embodiments, the first device may receive a connection request associated with first identifier and then pass this request to a device inside the local network. In one example, the means to pass the request to the device inside the local network that includes a proxy server, that accepts connection request initiated from external network address, initiates connection with the device inside the local network and passing request data to that device, receives response from the device inside the local network and then passes it to the to the external network address. In one instance, the proxy server extracts identifier of the device inside the local network from the information submitted with the connection request, and then determines local network address of the device from requested identifier by using at least one of the Address Resolution Protocol (ARP), multicast Domain Name Service (mDNS) and Simple Service Discovery Protocol (SSDP).

In some embodiments, a connection from the third device to the first device is established using a protocol from the group of Transport Level Security protocol, (TLS), Hypertext Transfer Protocol (HTTP), Web Real Time Communications (WebRTC) protocol and a protocol using Interactive Connectivity Establishment (ICE) framework.

In some embodiments, at least one device in the second group is programmed to validate eligibility of the third device to establish connection with the first device, and at least one device in the second group sends the first identifier to the first device only after eligibility of the third device to establish connections with the first device is validated.

In some instances, at least one predefined condition to block one or more previously allowed connections being from the group of the number of opened connections since they were allowed, number of allowed connections remaining after one or more of them were closed, and the time interval since one or more connections were allowed exceeding pre-defined threshold. In another instance, at least one predefined condition to block one or more previously allowed connections being first device blocking one or more connections from a different network address than one used by allowed connection.

In some embodiments, after initiating connection to a device from the second group but before receiving first identifier, the first device authenticates the second device by using Transport Layer Security (TLS) protocol. In one example of the described system, changing one or more rules comprises changing firewall rules on the first device.

In another embodiment, the system for managing connection routes between computer devices includes a first device connected to a computer network, the first device being programmed to initiate connections to one or more devices connected to computer networks, and to accept connections initiated by one or more devices connected to computer networks. The system further includes a second group of one or more devices connected to a computer network, the second group of devices each being programmed to (a) accept at least one connection initiated by the first device, (b) forward at least one connection request from another device to the first device through the connection opened by the first device, and (c) provide another device with identifier of the first device that could be used to establish direct connection with the first device, bypassing the second group.

The second group of devices may be programmed to perform actions including (a) accepting connection initiated by third device connected to the computer network and (b) determining whether the third device can be allowed to establish direct connection with the first device, and, if so, providing the third device with the identifier of the first device.

In some instances, the third device is not permitted to establish direct connection with the first device, and its connection to the first device is forwarded through the connection to the second group opened by the first device. In one example, determining whether the third device is permitted to establish direct connection with the first device comprises transmitting a request to the third device to provide authorization credentials and evaluating any credentials received in response.

In one embodiment, depending on one or parameters of connection from the third device to the device in second group, the second group of devices either evaluates whether the third device is allowed to directly connect with the first device, or forwards connection request from the third device to the first device through the connection opened by the first device without performing such an evaluation.

In some instances, the second group of devices evaluates whether the third device is allowed to connect to the first device, with the results of this evaluation being different for connection requests that should always be sent through the connection opened by the first device, or may be allowed to be sent directly to the first device.

For example, connection requests from the third device may use different resource locators to identify requests that should be passed through the connection opened by the first device, or may be allowed to directly connect to the first device.

In some embodiments, connection requests from the third device to the second group that should always be forwarded thought connection opened by the first device are sent to a different network address than requests that may be allowed to establish direct connection with the first device.

In some embodiments, connection requests from the third device to the second group that are always forwarded thought connection opened by the first device use HTTP protocol, while requests that may be allowed to establish direct connection with the first device use the Interactive Connectivity Establishment (ICE) framework.

In some embodiments, the second group of devices includes a Domain Name Server (DNS), said server receiving request to resolve domain name from the third device and, if the third device is allowed to establish direct connection with the first device, returning IP address of the first device, otherwise refraining from returning IP of the first device.

In some embodiments, the second group of devices includes a Virtual Private Network (VPN) server enabled to support reverse connections and connection established by the first device is a VPN tunnel.

In some embodiments, where the first device is connected to one or more devices inside the local network, it receives data from one other device outside of the local network, forwards the data to a device inside the local network, and then forwards the response to the device outside of the local network. For example, the first device may be one of the gateway, router, bridge, switch, proxy and firewall.

FIG. 1 illustrates an example network environment with connections between a local device 130 and remote computers 110 managed in accordance with an embodiment of the present invention. In this embodiment, an "Internet of Things" device 130 (such as a power switch, security camera, a light source, etc.), capable of both initiating connections to external network addresses and of responding to connections initiated from external network addresses, is connected to the local network 132 through the router 120, which routes the traffic between devices on the local network and computers 110 in a wide area network (WAN) 134. The router 120 may be enabled to block outbound connections from devices 130 on the local network 132 to a set of external IP addresses, while allowing incoming connections from the same set of external IP addresses. Such blocking can be implemented, for instance, by modifying firewall rules on the router 120, or having special modules added to the router 120 that block outgoing packets from local network 132.

FIG. 1 illustrates the case where all outbound connections 134 from the device 130 are blocked, while all inbound connections 136 are accepted and forwarded to the device 130. In the illustrated example, all external network addresses are blocked from receiving connections from the device 130, but remote computers 110 are allowed to initiate their own connections from the same external addresses.

This effectively disables ability of a device 130 to report any data obtained from the local network 132 to any server that doesn't know how to initiate its own connection with the device 130 through the router 120. Even if device 130 was compromised, this change prevents it from leaking sensitive data or becoming a part of a botnet.

In some embodiments, the router 120 may be combined with a Virtual Private Network (VPN) server, such as IPSEC (internet protocol security) VPN, and one of the devices 110 in the WAN 134 may initiate its own connection to the device 130 by using a VPN client. In this instance, the VPN client of the device 110 may be required by the router 120 or device 130 to submit its credentials (log in) before establishing the connection, ensuring that only authorized devices can connect to device 130 inside the local network 132.

Figure 2A:
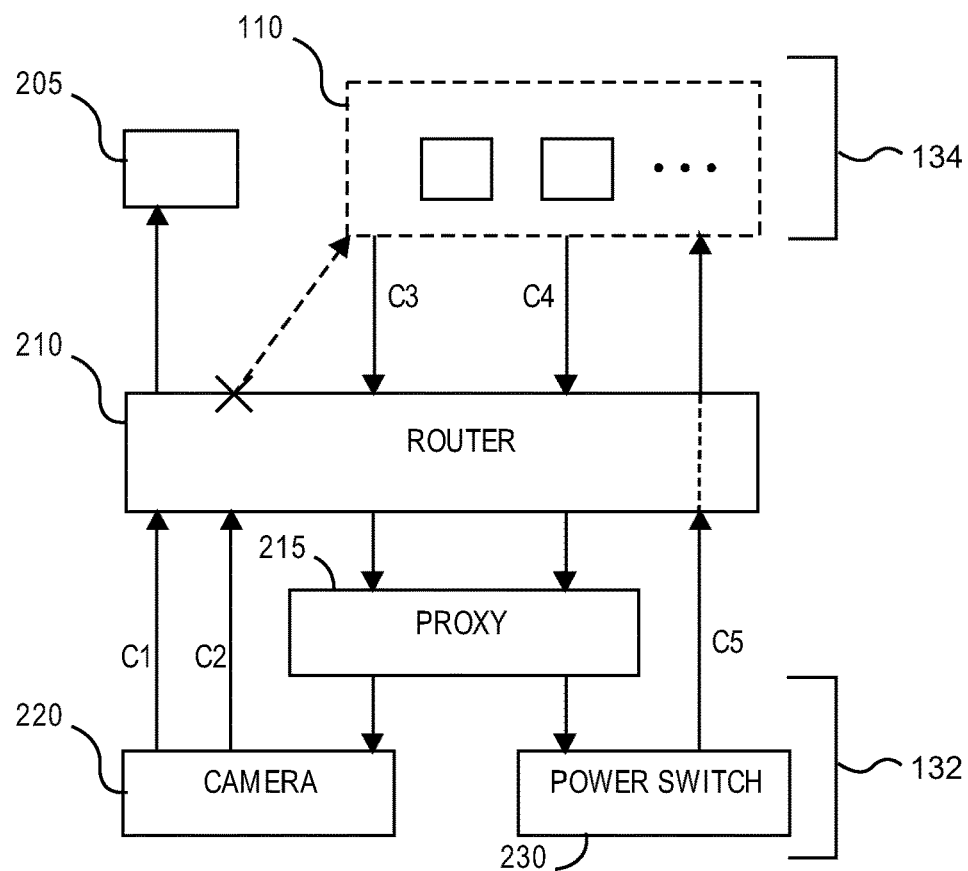
FIG. 2A is a schematic block diagram of the network environment with connections between multiple local devices and remote computers managed in accordance with an embodiment of the present invention.

Blocking all outgoing connections from the network 132 may prevent some devices from receiving automatic updates, or from issuing alerts. FIG. 2A illustrates a network environment with connections between multiple local devices such as security camera 220 and power switch 230, and remote computers 205 and 110.

In this embodiment, router 210 blocks all outbound connections from the power switch 230, if they are not preceded by the inbound connections from the external IP address used by the outbound connection. In the depicted embodiment, one of the devices 110 sends inbound connection (C4) to the router 210, which is passed to the power switch 230. Router 210 remembers the source IP address of the connection C4 and, after the power switch 230 issues an outbound connection request (C5) to that source IP address, router 210 allows this request to go through.

In some instances, the source IP address of the external device 110 is added to the list of allowed outbound IP addresses only if the inbound request from that address is issued to one or more specific identifiers of the router 210. For example, the source IP address is added to the list only if the inbound request is issued to a specific port on the router 210, or contains a specific URL pattern. In some embodiments, such a port can be used only once: all subsequent requests to the same port will not result in adding more IP addresses to the allowed list, to prevent unauthorized access.

In the depicted embodiment, router 210 allows selected outbound connections (C1) from the camera 220 to reach the server 205, even if they are not preceded by an inbound connection from the same IP address; all other outbound connections from the camera 220 are blocked (C2). For instance, server 205 could be an email server, which allows security camera to send an alert when motion is detected.

The router 210 can identify allowed connections, for instance, by domain or by IP address. If the white list of allowed outbound connections contains domains, router may perform a reverse DNS lookup to get the domain corresponding to that IP address, before making a decision whether to block an outbound connection.

In some implementations, the router 210 may store the list of outbound connection identifiers (domains, IP addresses, ports, URLs) that should be blocked (black list), instead of storing ones that should be allowed (white list): for instance, the router 210 may store the list of known domains and IP addresses of malicious servers. However, this information could be incomplete and would require frequent updates. A preferred implementation may store a short list of allowed identifiers, for instance domains or IP addresses of the vendor sites for the corresponding IoT devices.

In the embodiment of FIG. 2A, devices 110 are allowed to establish connections with devices 220, 230 inside the local network without installing VPN clients. An incoming connection (C3, C4) is passed from the router 210 to a proxy server 215. This proxy server accepts connection request from an external IP address, determines the destination local device, establishes the connection with that local device and passes the data between the local device and the device on the WAN 134.

In one example, a client computer 110 may use a regular web browser to issue HTTP or HTTPS request to a known domain. Such domain may, for instance, resolve to an IP address of the router 210, while including a subdomain specifying an intended recipient device 220, 230 inside the local network 132.

In this example, proxy 215 extracts the subdomain from the host header (HTTP) or SNI header (HTTPS), and the uses this identifier to find IP address of the recipient device 220, 230 on the local network 132. To do that, it may use service discovery protocols such as multicast Domain Name Service (mDNS) or Simple Service Discovery Protocol (SSDP) to obtain descriptions of devices on the local network 132, find the description matching the string associated with requested identifier with the description of specific device to obtain its MAC address, and then use information from the Address Resolution Protocol (ARP) table to obtain IP address of the intended recipient of the request. Other known solutions and protocols can be used to discover IP addresses of the devices 220, 230 inside the local network 132. In the illustrated embodiment such discovery happens after request to connect to the local device is received from the external IP address.

In some implementations, proxy 215 may be combined with the router 210 or with another module responsible for controlling the data exchange between the local network 132 and the WAN 134 (such as, for instance, a gateway, access point, bridge, or firewall).

In other implementations, proxy 215 can be deployed as a stand-alone device, used to receive all incoming connections from the router 210 and then to forward them to intended recipients in the local network 132.

Figure 2B:
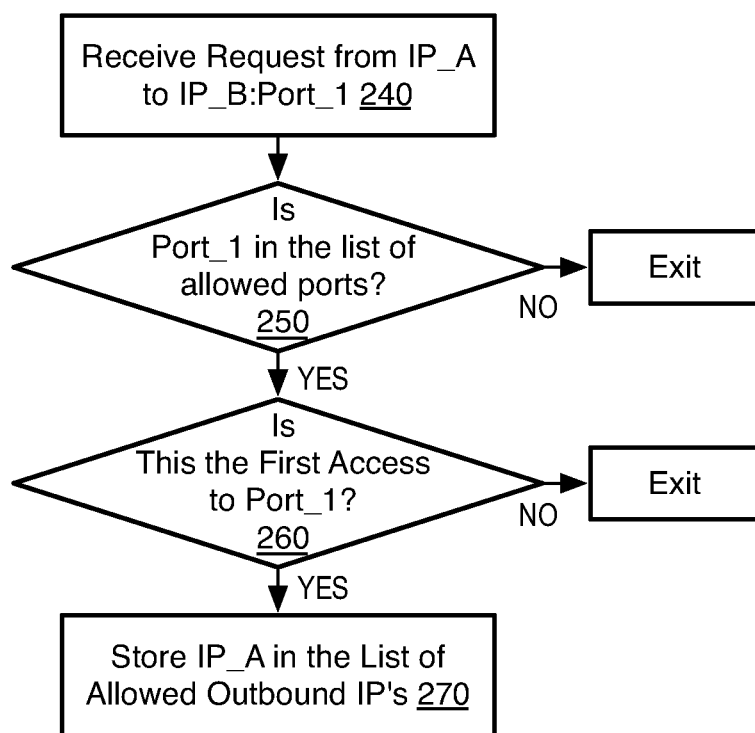
FIG. 2B is a process flow diagram for managing outbound connections from the local devices in accordance with an embodiment of the present invention.

FIG. 2B is a process flow diagram of a method for managing outbound connections from the local devices in accordance with an embodiment of the present invention. Before receiving inbound request from an external device 110, the router 210 announces its own IP and port (IP_B: Port_1) as a way for an IoT vendor to allow outbound connections to its own server. Such an announcement can be sent, for instance, through a secure third-party authorization service that would authenticate an IoT vendor before disclosing the router's IP and port.

The IoT device (e.g. 220, 230) then issues a request from its source IP_A. The router 210 receives this request (step 240) and checks if the destination port matches the list of allowed ports (step 250), and if this is the first access to that port (step 260). Only if these 2 conditions are met, is IP_A is stored (step 270) by the router 210 in the list of allowed outbound IPs.

FIG. 3 illustrates a system for preventing exposure of the IP address of a router 350 to external devices 310 in a network environment with connections between local devices 130 and authorized remote computers 310 through a VPN tunnel, managed in accordance with an embodiment of the present invention.

In this embodiment, router 350 contains a VPN client, and uses it establish a connection 352 with a VPN server 340. Both VPN server 340 and VPN client may authenticate each other using, for instance, pre-shared key or private/public key exchanges to make sure that both parties can be trusted. In this implementation, VPN server 340 is enabled to use reverse connections through the tunnel 352 opened by the router 350 to pass requests from external network addresses in WAN 134 to the router 350. In the illustrated embodiment, clients 310, 320 first connect to the authorizer 330, which ensures that only authorized clients (for instance, ones submitting valid user name and password) are allowed to issue requests to the router 350. In the illustrated embodiment, authorizer 330 is combined with a proxy that passes connection requests from the validated clients to the VPN server 340, while blocking invalid clients. In other embodiments, authorized clients may be allowed to issue requests to the VPN server 340 directly, or completely bypass authorization and connect to the VPN server 340.

In the illustrated embodiment, router 350 only accepts incoming connections 354 if they are received through the connection 352 opened by that router to an intermediary server, such as VPN server 340. Router 350 blocks any incoming connection 356 that bypasses the VPN tunnel, preventing the possibility of exploits or other attacks. In this implementation, clients 310, 320 connecting to a local device 130 do not receive from the router 350 or devices 130, or any other component, the real IP address of the router 350 and can only connect to the proxy 330 or a VPN server 340. This provides further security, hiding the router 350 from external attacks such as Distributed Denial of Service (DDoS) attacks.

In another implementation, the router 350 may establish a connection 352 with an external HTTP or HTTPS proxy server, instead of a VPN server 340. This server should be enabled to use the established connection 352 to pass the data from external clients 310, 320 to the router 350, without the need to establish new connections to the router 350 for each external client 310, 320.

FIGS. 4A and 4B illustrate a method of securing remote communications with devices 130 inside the local network 132 in accordance with an embodiment of the present invention. Referring specifically to FIG. 4A, a device controlling data exchange between the local network 132 and WAN 134 (hereinafter "the controlling device," e.g. the router 350) receives a request from dev_1 (e.g. one of the devices 130) on the local network 132 to establish an outbound connection with an external IP address IP_A (step 410). The controlling device then checks whether dev_1 is allowed to initiate outbound requests (step 420), such as according to a whitelist, blacklist or other pre-configured rules, and, if not, blocks the outbound request. For instance, some devices may never be allowed to initiate outbound connections, especially if their vendors can't be trusted to maintain sufficient security. In some implementations, this step can be skipped. The method may further include evaluating, by the controlling device, whether dev_1 may initiate at least some outbound connections. For example, the outbound connection may attempt to connect to an IP address in a white list (step 430). If not, such an outbound connection request will be blocked. If yes, the request is sent to the destination IP (step 440). In other implementations, a black list can be used instead of a white list, or different identifiers can be used instead of IP addresses (for instance, domain, port or protocol, or a combination of such identifiers).

Referring to FIG. 4B, the controlling device receives a request from external IP address IP_A to establish connection with a device inside the local network dev_1 (step 450). After determining the local IP address of dev_1 (step 460), the request is sent to dev_1 (step 470), and response is forwarded back to IP_A. Accordingly to the present invention, such incoming request can be allowed even if it comes from the same range of IP addresses that was blocked from receiving outbound connection requests from the same local device (e.g. according to the method of FIG. 4A). For instance, a local device 130 may not be allowed to send real-time reports about events on the local network 132 to the vendor's server, but may still receive periodic status requests from the same server to make sure it functions properly. In other instance, all routable IP ranges may be blocked from receiving outbound connections from local network 132, while being allowed to initiate incoming connections.

FIG. 5 illustrates a method of securing remote communications with devices 130 inside the local network 132 through a VPN tunnel 352, in accordance with an embodiment of the present invention. In this case, the controlling device opens a connection to a VPN server (step 510), receives a request for an incoming connection to dev_1 on the local network 132 (step 520) and checks whether this request came through the same VPN tunnel 352 (step 530). The request is passed to dev_1 only if it came though that tunnel (step 540). Otherwise the request is blocked.

In some embodiments, only incoming connections to local devices 130 are allowed through the tunnel 352 and outgoing connections from the local devices 130 are still blocked, even if they are sent to the IP address of the VPN server 340.

In one implementation, outbound connections from the devices 130 are blocked by the router 350 when the initial packets of these connections are sent through the router 350, without allowing any of initial packets to reach an intended recipient device 130. In another implementation, the router 350 may allow outbound connection request to reach an intended external recipient 310, 320, and then block a response packet or some payload packets from the external recipient 310, 320. In other implementations the router 350 may modify exchanged packets instead of blocking them, as long as this modification is sufficient to prevent intended data exchange between the local device 130 and a device 310, 320 outside of the local network 132.

In a different aspect of the present invention, one or more devices 130 inside the local network 132 are not allowed by the router 350 to receive connection requests from one or more computers 310, 320 outside of the local network 132, but are allowed by the router 350 to respond to commands initiated by another other device 130 on the same network 132, which are allowed to receive requests from external IP addresses. For instance, an IoT device 130 such as a power switch 230 may be allowed to receive a command from another device 130 on the local network 132 such as an IoT hub or a bridge, but may not be allowed to receive direct requests from external IP addresses in the WAN 134. In one implementation, one or more devices 130 inside the local network 132 may only receive a limited set of commands from other devices 130, 110 inside or outside the local network 132, for instance commands defined by a User Interface (UI). For instance, a power switch 230 or an IoT bridge presents a UI that only contains an On/Off switch. Accordingly external devices 110 may only perform this operation, but aren't allowed to send any other command (for instance, ask for a history of prior interactions).

In another aspect of the present invention, a system provides for managing of communications between devices 130 inside a local network 132. The system includes a first device having means to control traffic between devices 130 inside the local network 132, such as the router 120, 210, 350 of FIGS. 1 through 3 or some other device. The devices 130 are enabled to initiate local connections with other devices 130 on the same network 132 and to respond to local connections from other devices 130 on the same network 132.

The first device is further programmed to block local connections initiated by one or more devices 110 on the local network 132, while allowing one or more of these devices 130 to respond to local connections initiated by other devices 130 on the local network 132.

In some embodiments, a second device is programmed to accept at least one inbound connection from an external IP address, the connection from the external IP address including a reference to the first device, the second device being further programmed to, for at least one first outbound connection from the first device to a first address within the local network 132, if the at least one first outbound connection was not preceded by an inbound connection including a reference to the first device, blocking the at least one first outbound connection.

In some instances, the second device is further programmed to, for at least one second outbound connection from the first device to a second address within the local network, permit the at least one second outbound connection regardless of whether the at least one second outbound connection was preceded by an inbound connection to the first device including the second address.

In some embodiments, the first device applies different rules to the first and the second group of devices 130 on the local network 132, blocking connections from the first group to the second group, but allowing local connections from the second group to the first group. In some embodiments, local connections from one or more devices 130 to at least one device are allowed by the first device, while local connections from the same one or more devices 130 to at least one other device 130 are blocked by the first device.

The first device could be, for example, a gateway, a router, a bridge, a switch, a proxy or a firewall. In some embodiments, the first device identifies other devices 130 on the local network 132 based on information obtained from at least one of Address Resolution Protocol (ARP), multicast Domain Name Service (mDNS), and Simple Service Discovery Protocol (SSDP). One or more devices 130 on the local network 132 that need their connections to be blocked may be identified by the first device by their names or descriptions. In one example, at least one of these devices 130 to be blocked from initiating connections to other devices 130 is specified by the user of the first device.

The first device may block one or more local connections, for instance, by blocking at least one data packet from the device 130 initiating the connection. In another instance, the first device blocks one or more local connections by blocking at least one data packet from the device 130 responding to the connection initiated by the other device 130. In one embodiment, the first device identifies the device 130 initiating the local connection by analyzing information about the packets previously sent or received by the same device 130, for instance by detecting that a first device 130 has sent a packet to the a second device 130 without previously receiving a packet from the second device 130 for at least pre-defined time interval.

FIGS. 6A and 6B illustrate a method of managing communications between devices 130 inside a local network 132 in accordance with an embodiment of the present invention. Referring to FIG. 6A, a device controlling the data exchange between other devices on the local network (hereinafter "the controlling device," for instance, a router or a gateway 120, 210, 350), receives a request form a device 130 (dev_1) inside the local network 132 to connect to another device 130 (dev_2) inside the same local network 132 (step 610). Instead of immediately sending connection request to dev_2, the controlling device first checks if dev_1 is allowed according to one or more pre-specified rules to initiate at least some outgoing connections (step 620), and blocks the outgoing connection if not. If dev_1 is allowed, according to the pre-specified rules, to initiate at least some connections, step 630 further includes checking if it is allowed to initiate connection to dev_2 and sends a request to dev_2 (step 640) only if such connection is allowed by the pre-specified rules.

In one implementation, the controlling device may block a first device 130 inside the local network 123 from initiating connection to a second device 130, but allow the second device 130 to initiate connection to the first device 130. This differentiates present invention from the prior art solution known as "client isolation", where devices on the same local network are blocked from communicating with each other in both directions.

The systems and methods disclosed herein provide a way to limit some devices 130 on the local network 1323 (for instance, a single-function IoT devices such as power switches) to a listen-only mode, while allowing other devices on the same network 132 (for instance, mobile phone or a laptop) to send commands to other devices. Many IoT devices (such as power switches, lights, thermostats) are designed to function without connecting to other devices on the same network, and may try to access other devices on the same network 132 only if they are compromised. The solution disclosed herein improves security inside the local network in the presence of untrusted devices.

In some embodiments, rules specifying which devices 130 are allowed to initiate outgoing connections to other devices 130 are initially provided to the controlling device in reference to at least partial device descriptions or names. The controlling device may, for instance, use Address Resolution Protocol (ARP table) to determine a MAC address of the device 130 issuing a connection request, and then use multicast Domain Name Service (mDNS) or Simple Service Discovery Protocol (SSDP) to get the description or name of that device from its MAC address. In other embodiments, a device 130 on the local network 132 may be explicitly identified by its MAC or IP address, or by other rules. For instance, a user may specify that only single device 130 (for instance, a mobile phone) is allowed to initiate connections to other devices 130 on the same network 132 130, while other devices should only responds to connections initiated by other devices 130.

FIG. 6B, illustrates an example method for detecting the device 130 on the local network 132 that initiated the connection request to another device. The controlling device receives a packet from dev_1 to dev_2, which are devices 130 in the local network 132 (step 650) and then checks if the packet from dev_2 to dev_1 was received recently, for instance within a predefined time interval such as 5s (step 660). If such packet wasn't received, dev_1 is considered a request initiator and can be blocked if it isn't permitted to initiate the requests according to pre-specified rules; otherwise, dev_1 is considered by the controlling device to be a responder to request from dev_2 and controlling devices sends the packet to dev_2 (step 670).

Figure 7:
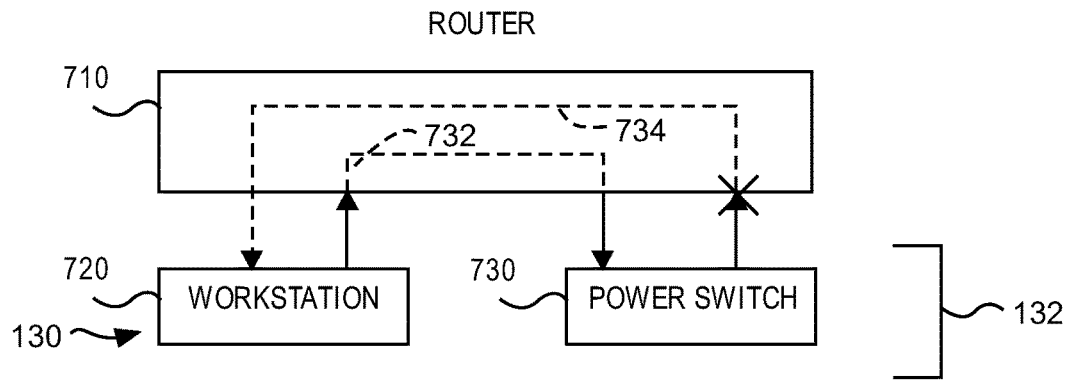
FIG. 7 is a schematic block diagram of the network environment with connections between 2 devices inside the local network, managed in accordance with an embodiment of the present invention.

FIG. 7 illustrates a network environment with connections between two devices 720, 730 inside the local network 132, managed in accordance with the methods disclosed herein. A router 710 controls all traffic between devices on a local network, such as a workstation 720 and a power switch 730. In the illustrated embodiment, only workstation 720 is allowed to initiate connection requests 732 to other device on the same local network 132 whereas power switch 730 is only allowed to receive the incoming connections. Outgoing connections 734 from the power switch 730 are blocked by the router 710.

Figure 8:
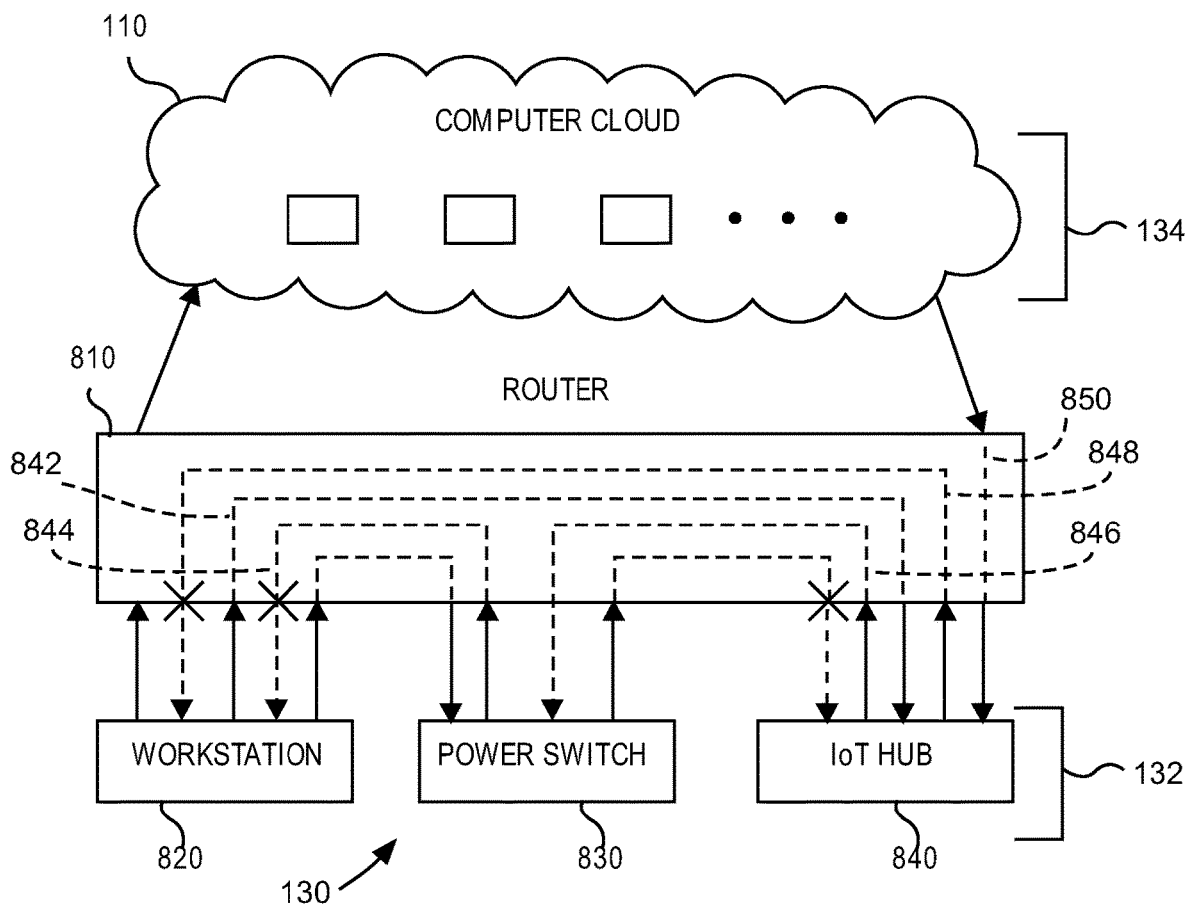
FIG. 8 is a schematic block diagram of the network environment with connections between 3 devices inside the local network, managed in accordance with an embodiment of the present invention.

FIG. 8 illustrates a network environment with connections between three devices 130 inside the local network 132, managed in accordance with an embodiment of the present invention. In this implementation, router 810 uses different sets of rules to control different devices 130 on the same local network: workstation 820 is allowed to initiate connections 842 to any other device 130 inside the local network 132; power switch 830 is not allowed to initiate any connections 844 to other devices 130; IoT hub 840 is allowed to initiate connections 846 to the power switch 830 after at least one pre-existing condition is met, but is never allowed to initiate connections 848 to the workstation 820. This reflects the hierarchy of trust: workstation 820 (or another computer under direct user control, such as a mobile phone) is allowed to send commands to any other device 130; IoT hub 840 is only allowed to control a subset of allowed IoT devices 130, while end-point IoT devices 130 (e.g. power switch 830) are only allowed to respond to commands.

In the illustrated embodiment, these rules for connections inside the local network 132 are combined with the rules controlling connections initiated with the computers 110 in the WAN 132. The workstation 820 is permitted to initiate connection to any computer, inside or outside the local network; power switch 830 isn't allowed to initiate connections to any computer, whether inside or outside the local network.

In this example, IoT hub 840 is allowed to receive inbound connections 850 from at least one computer outside of the local network. Furthermore, after receiving a connection from the computer outside of the local network 132, containing a reference to the IoT device 840, router 810 allows the IoT device 840 to issue an outbound connection 846 to another device on the local network, such as a power switch 830. In some embodiments, a request from a computer 110 outside of the local network 132 may contain a reference to a recipient of the connections from other devices on the local network (for instance, power switch 830), allowing other devices on the local network to issue outbound requests to the power switch 830.

In one implementation of depicted embodiment, IoT hub 840 isn't allowed to initiate connections with other devices on the same local network until it receives permission from IoT vendor's server. To provide this permission, IoT vendor acquires network address of the router 810 and then issues a request authorizing the router to allow outbound connections on the local network from the device 840. IoT vendor may acquire router's network address during registration of the device 840, or after being authorized by the third party service. To make sure that only authorized devices are allowed to connect with other devices on the local network 132, the IoT vendor may provide additional information to the router 810, to be used to authenticate the device 840: for instance, a public encryption key that router 810 can use to verify that device 840 is in possession of a private key as installed by the IoT vendor.

In the implementation of FIG. 7, router 710 blocks all outgoing connections from device 730 immediately after they are received, without allowing the intended recipient to start the connection process (see Xs in FIG. 7 illustrating the point where a request 734 from device 730 enters the router 710).

In some embodiments, a router 810 may allow connection request to reach intended recipient, and then block a response packet or some payload packets. FIG. 8 illustrates this process by displaying a blocking sign (see X's) at the point where an intended connection request 844 would leave the router 810 had it not been blocked. In other implementations, the router 810 may modify exchanged packets instead of blocking them, as long as this modification is sufficient to prevent two devices from actually performing an intended data exchange.

In some embodiments, one or more devices 130 inside a local network 132 are allowed to receive connection requests from one or more other devices 130 on the same local network only if such requests belong to a limited set of commands, for instance ones offered by a User Interface (UI). For instance, IoT device such as a power switch 830 may only be allowed to receive a request from the IoT hub 840 if that request was initiated by the user interacting with UI displayed by the IoT hub 840 or another device, such as the router 810.

In some embodiments, a system includes a first device connected to a computer network. The first device includes means to initiate connections to a first group of one or more devices connected to computer networks, and to determine whether to accept or reject connections initiated by one or more devices by using a set of rules available to the first device. A second group of one or more devices are also connected to a computer network, at least one device in the second group being enabled to accept one or more connections initiated by the first device and to send data to the first device through at least one of these connections.

The first device may be further programmed to initiate a connection to a device in the second group and to receive through this connection information about one or more first identifiers of one or more connections to the first device expected to be initiated by a third device. The first device is programmed to, in response to the information, change one or more rules to accept one or more connections associated with one or more first identifiers. In particular, the first device may accept, based on the one or more rules, one or more connections from a third device having the one or more first identifiers. Upon detecting at least one pre-defined condition being satisfied, the first device is programmed to change the one or more rules to block one or more connections associated with one or more first identifiers. In some embodiments, first identifiers may include one or more parameters of expected connections including some or all of a set of source IP address, a source port, a transport protocol and data pattern.

In some embodiments, the first device is connected to one or more devices inside the local network. The first device is further programmed to receive a connection request associated with the first identifier, and then pass this request to a device inside the local network. In one example, the includes passing the request to a proxy server in the local network that accepts connection request initiated from an external network address, initiates a connection with the device inside the local network, passes request data to that device, receives a response from the device inside the local network, and then passes it to the to the external network address. In some embodiments, the proxy server extracts an identifier of the device inside the local network from the information submitted with the connection request, and then determines local network address of the device from requested identifier by using at least one of the Address Resolution Protocol (ARP), multicast Domain Name Service (mDNS) and Simple Service Discovery Protocol (SSDP).

In one implementation, a connection from the third device to the first device is established using a protocol from the group of Transport Level Security protocol, (TLS), Hypertext Transfer Protocol (HTTP), Web Real Time Communications (WebRTC) protocol and a protocol using Interactive Connectivity Establishment (ICE) framework.

In one other embodiment, at least one device in the second group is enabled to validate eligibility of the third device to establish connection with the first device, and at least one device in the second group sends the first identifier to the first device only after eligibility of the third device to establish connections with the first device is confirmed.

In some embodiments, the at least one predefined condition to block one or more previously allowed connections includes the number of opened connections since they were allowed, a number of allowed connections remaining after one or more of them were closed, and the time interval since one or more connections were allowed exceeding predefined threshold. In some embodiments, the at least one predefined condition to block one or more previously allowed connections includes the first device blocking one or more connections from a different network address than one used by the allowed connection.

In one implementation, after initiating connection to a device from the second group but before receiving first identifier, the first device authenticates the second device by using Transport Layer Security (TLS) protocol. In one example of the described system, changing one or more rules includes changing firewall rules on the first device.

Figure 9:
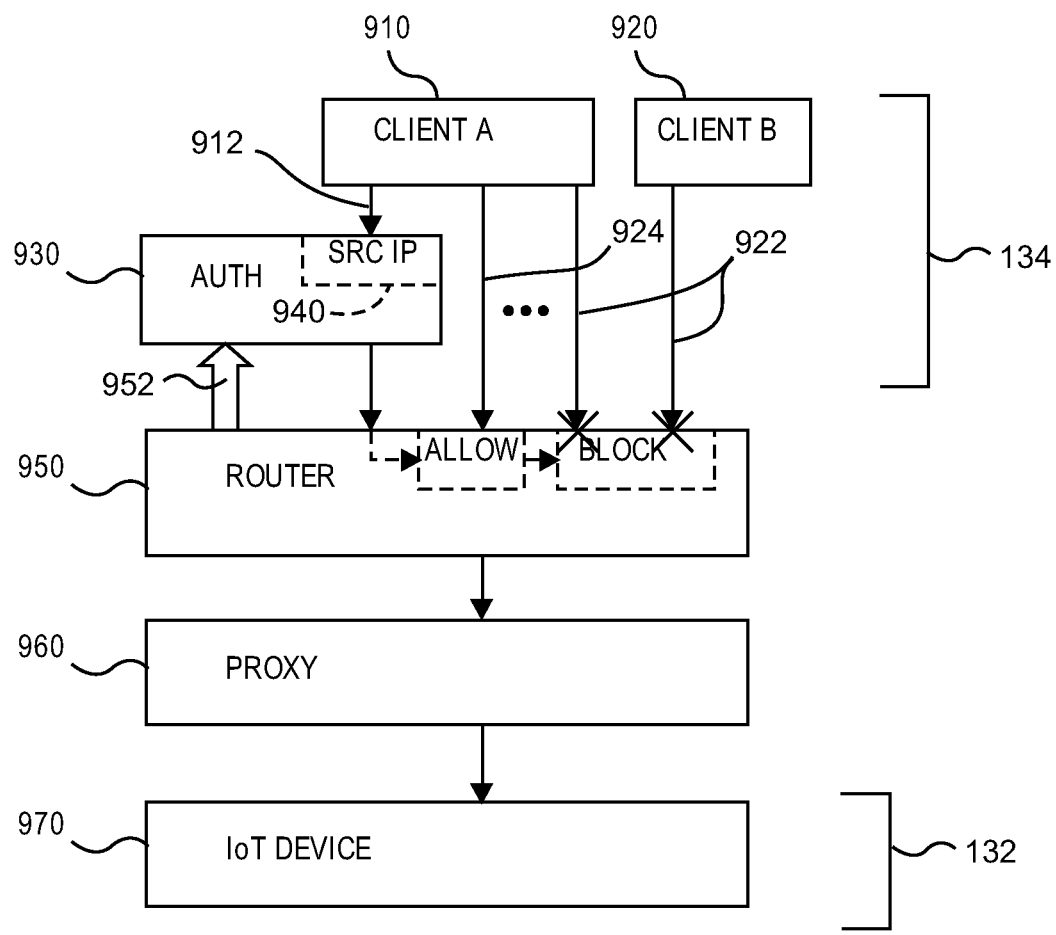
FIG. 9 is a schematic block diagram of the network environment with direct connections between remote computers and a device inside the local network, managed in accordance with an embodiment of the present invention.

FIG. 9 is a diagram of the network environment with direct connections between remote computers and a device inside the local network, managed in accordance with an embodiment of the present invention.

In this embodiment, router 950 initiates a connection 952 to a computer 930 in the WAN 134. Computer 930 can be one of the groups of one or more connected computers enabled to accept and authorize incoming requests from different devices, and to send the data through reverse connections opened by different devices. In one instance, router 950 may authenticate computer 930, for example by using TLS protocol.

In the illustrated embodiment, computer 930 contains an authorizer module. A client 910 connects to this computer and submits to an authorization procedure. It may involve, for instance, providing user name and password, using public/private certificate exchange, multi-factor authentication or another authentication procedure known to a person skilled in the art. While being connected to the computer 930, client 910 provides an indication 912 that it wants to connect to the router 950. This indication can be provided, for instance, by issuing a request to a URL pointing to computer 930 but containing a subdomain, path or file name referencing router 950. In another implementation, user of the device 910 may select router 950 from the list provided by the computer 930 after being authorized.

Before the client 910 is authorized, router 950 is set to block one or more incoming requests 922 from external IP addresses, including client's source IP address. Accordingly to the present invention, after computer 930, or one of the computers from the connected group, determines that client 910 intends to access the router 950 and authorizes the client 910, an identifier of the client device 910 is passed to the router 950 through the connection previously opened by that router to the computer 930. Subsequent to receiving the identifier of the client device 910 from the computer 930, connection requests 924 from the computer 910 will be allowed by the router 950.

In the other embodiments, an identifier of the device 910 intending to access the router 950 can be passed through a separate connection: for instance, router 950 may be set to accept connection requests from computer 930 or connected computers.

The illustrated embodiment shows an example where a source IP address of the client 910 is extracted by a module 940 and then passed to the router 950. In the other implementations, this identifier may include source port, access protocol or an access data pattern. For instance, if client 910 intends to establish HTTP or HTTPS connection with the router 950, it may provide server 930 with a data pattern (such as portion of the TLS handshake, name of the requested resource, data inside the request header or the payload) that, after being passed to the router 950, could be detected to allow incoming connection.

Instead of or in addition to using Transport Level Security (TLS) or HTTP protocol, client 910 may use Web Real Time Communications (WebRTC) protocol or another protocol using Interactive Connectivity Establishment (ICE) framework to connect to the router 950. The router 950 may use the characteristics of the intended protocol as another identifier of the valid connection.

After receiving identifier of the client 910, router 950 changes one or more of its rules to allow incoming connection 924 matching this identifier. For instance, after receiving the source IP of the client 910, router 950 temporarily changes firewall rules to allow incoming requests from this source IP. Clients that didn't pass authorization, such as client 920, will not be allowed to access the router 950, even if they know its IP address.

To further improve router security and prevent unauthorized access, in one implementation the router 950 allows connections to be initiated by an authorized device such as client 910 only until one or more pre-defined conditions are met. For instance, the router 950 may block new connections from the source IP of device 910 if they are initiated long after the device 910 was authorized (for instance, authorization expires in 1 hour or some other time limit). In some embodiments, device 910 may continue requesting authorization from the computer 930 periodically, in order to extend its ability to connect with the router 950. In another example, router 950 may block new or current connections from the client 910 after receiving indications of abuse or extensive use of resources: for instance, too many new connections opened from the source IP of the client 910, too many connections opened from other authorized clients, or one or more connection attempts from unknown source IPs other than those that have been previously authorized as described above.

In an alternative embodiment, instead of passing to the router 950 an identifier provided by the device 910, the router 950 or one of the connected computers 930 may provide a connection identifier both to the device 910 and to the router 950. For instance, computer 930 may instruct the device 910 to use a specific source port, or to include specific data pattern into one of the request headers. The computer 930 transmits this same information to the router 950 to identify valid requests. The router 950 may then allow connection requests that include this information received from the computer 930.

In another embodiment, a unique identifier can be received from the router 950 that changes the rules to temporarily accept connections coming from specific port or having a specific data patters. In that case, computer 930 may only need to inform an authorized client 910 which identifier to use while connecting to the router 950.

In the embodiment illustrated on FIG. 9, router 950 controls data exchange between the local network 132 and a WAN 134. The local network 132 contains at least one IoT device 970 and client 910 establishes connection with router 950 with intention of connecting to the device 970. In this embodiment, an accepted incoming connection 924, intended for device 970, is passed from the router 950 to a proxy server 960. This proxy server accepts connection request from an external IP address, determines the destination local device, establishes the connection with that local device 970 and passes the data between the local device 970 and the device 910 on the WAN 134.

In one example, client 910 may connect to device 970 using a regular web browser to issue HTTP or HTTPS request to a known domain. Such domain may, for instance, resolve to an IP address of the router 950 while including a subdomain specifying intended recipient device inside the local network, e.g. the IP address of the device 970.

In this example, the proxy 960 extracts the subdomain from the host header (HTTP) or SNI header (HTTPS), and the uses this identifier to find the IP address of the recipient device 970 on the local network 132. To do that, it may use service discovery protocols such as multicast Domain Name Service (mDNS) or Simple Service Discovery Protocol (SSDP) to obtain descriptions of devices on the local network, find the description matching the string associated with requested identifier with the description of specific device to obtain its MAC address, and then use information from the Address Resolution Protocol (ARP) table to obtain IP address of the intended recipient of the request. Other known solutions and protocols can be used to discover IP addresses of the devices inside the local network 132. However, as outlined above, such discovery happens only after the request to connect to the local device 970 is received from the external IP address.

In some implementations, proxy 960 may be combined with the router 950 or with another module responsible for controlling the data exchange between the local network and a WAN (such as, for instance, gateway, access point, bridge, or firewall). In other implementations, proxy 960 can be deployed as a stand-alone device, used to receive all incoming connections from the router 950 and then to forward them to intended recipient devices.

Figure 10C:
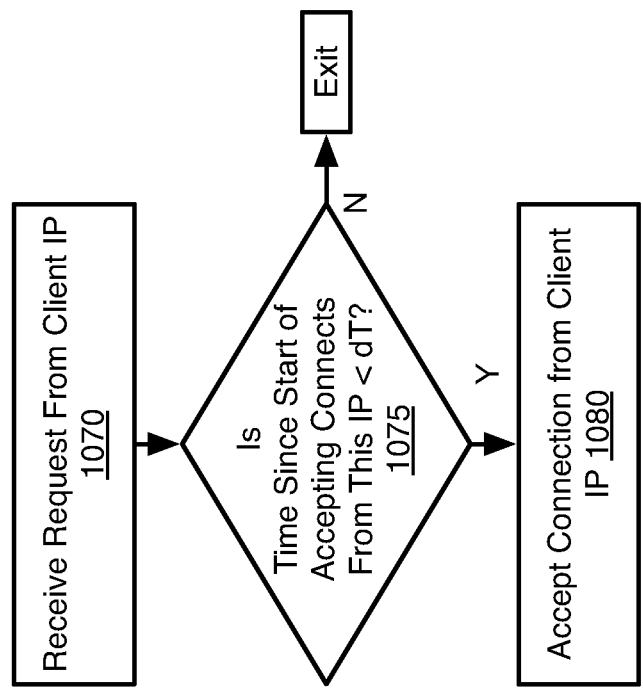
FIGS. 10A through 10C are process flow diagrams for a method of managing direct connections to protected devices in accordance with an embodiment of the present invention.
Figure 10B:
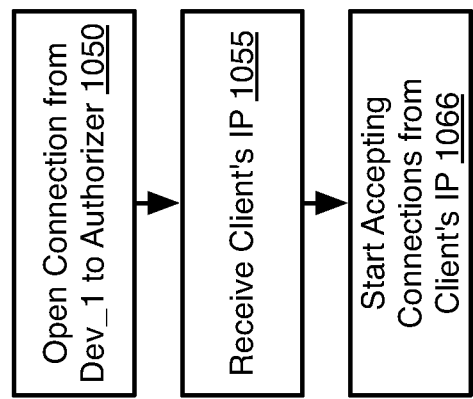
Figure 10A:
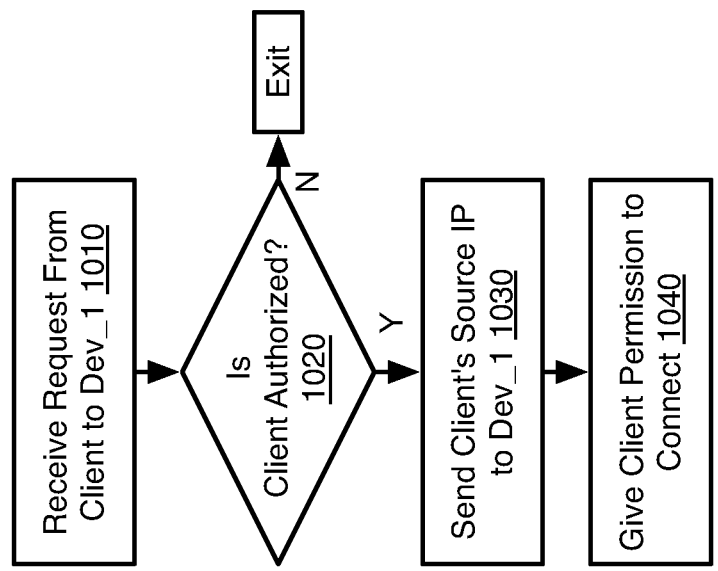

FIGS. 10A through 10C illustrate a method of managing direct connections to protected devices in accordance with an embodiment of the present invention. This embodiment describes a general case where a protected device could be any computer in the computer network, for instance a server containing sensitive information and using a third-party service to protect itself from unauthorized access.

Referring to FIG. 10A, the authorization server 930 receivers a request from a computer 910 (for instance, having a client software such as a web browser), requesting to access protected computer dev_1 (step 1010). After that, authorization server 930 determines whether client can be authorized (step 1020), such as according to one or more pre-defined rules. If so, the authorization server sends client's source IP to the protected computer 970 (step 1030) and gives client 910 permission to connect (step 1040).

Referring to FIG. 10B, the protected computer 970 opens its own trusted connection to an authorizer (e.g. authorization server 930 or router 950) (step 1050) and receives the source IP of the authorized client 910 (step 1055). The protected computer 970 then prepares to accept connections from the provided source IP address (step 1066).

Referring to FIG. 10C, the protected computer 970 receives a connection request from the external IP address of the client 910 and determines that the request includes an identifier that matches an identifier received from the authorizer (router 950 or authorization server 930) and then performs an additional step 1075 to determine if permission to accept this connection should remain valid. In the implementation of FIG. 10C, protected computer 970 determines if new request came within pre-defined time dT since the access was granted to client 910 (step 1075). The protected computer 970 accepts connections from the external IP address of client 910 only if this is the case (step 1080).

In other embodiments of the present invention, a computer comprising a part of a protection service (e.g. the router 950 or authorization server 930) may inform both the client 910 and protected device 970 about the identifier for an allowed request, or receive such identifier (such as a specific source port) from the protected device 970 and pass it to the client 910. In the last case, the protected device 970 may define rules to accept connections from a specific port before the client 910 is authorized. The systems and methods disclosed herein allow the protected device to create temporary access conditions that would be limited to specific clients, and then to cancel this access if some pre-defined events are detected.

For instance, instead of setting permanent port forwarding, the router 950 may open a specific port only for a pre-defined time, in coordination with the protection service (e.g. authorization server 930) and with additional parameters describing the connecting client 910.

In another embodiment, one or more servers (e.g. router 950) used to exchange identifiers of the allowed connections don't have to include an authorizer 930. For instance, such a server may only detect the source IP of the client 910 isn't in the list of known IP addresses of malicious servers, or comes from the specific geo-location, or remains within the pre-defined number of connections that can be simultaneously opened to a protected server. In all such cases, present invention provides a way for a protected server to ignore unwanted connections.

In some embodiments, a system for managing connection routes between computer devices includes a first device connected to a computer network. The first device has means to initiate connections to one or more devices connected to computer networks, and to accept connections initiated by one or more devices connected to computer networks. The system further includes a second group of one or more devices connected to the computer network and having means to accept at least one connection initiated by the first device and forward at least one connection request from another device to the first device through the connection opened by the first device. The second group of one or more devices may further be programmed to provide another device with an identifier of the first device that could be used to establish direct connection with the first device, bypassing the second group of one or more devices.

The second group of devices may further be programmed to accept a connection initiated by third device connected to the computer network and determining whether the third device can be allowed to establish direct connection with the first device. If so, the devices of the second group of devices provide the third device with the identifier (e.g. IP address or subdomain) of the first device.

In some embodiments, the third device is not permitted to establish a direct connection with the first device, and its connection to the first device is forwarded through the connection to the second group opened by the first device. In one example, determining whether the third device can be allowed to establish a direct connection with the first device includes requesting that the third device to provide authorization credentials and evaluating any authenticity of any authorization credentials provided.

In some embodiments, depending on one or parameters of a connection from the third device to the device in second group, the second group of devices either evaluates whether the third device is allowed to directly connect with the first device, or forwards connection request from the third device to the first device through the connection opened by the first device without performing such evaluation.

In some embodiments, the second group of devices evaluates whether the third device is allowed to connect to the first device, results of this evaluation being different for connection requests that should always be sent through the connection opened by the first device, or may be allowed to be sent directly to the first device.

In some embodiments, connection requests from the third device use different resource locators to identify requests that should be passed through the connection opened by the first device, or may be allowed to directly connect to the first device.

In some embodiments, connection requests from the third device to the second group that should always be forwarded thought connection opened by the first device are sent to a different network address than requests that may be allowed to establish direct connection with the first device.

In some embodiments, connection requests from the third device to the second group that should always be forwarded thought connection opened by the first device use HTTP protocol, while requests that may be allowed to establish direct connection with the first device use Interactive Connectivity Establishment (ICE) framework.

In some embodiments, the second group of devices includes a Domain Name Server (DNS), said server receiving request to resolve domain name from the third device and, if the third device is allowed to establish direct connection with the first device, returning IP address of the first device, otherwise refraining from returning IP of the first device.

In some embodiments, the second group of devices includes a Virtual Private Network (VPN) server enabled to support reverse connections and connection established by the first device is a VPN tunnel.

In some embodiments, where the first device is connected to one or more devices inside the local network, the first device receives data from one other device outside of the local network, forwards the data to a device inside the local network, and then forwards the response to the device outside of the local network.

The first device may be function as some or all of a gateway, router, bridge, switch, proxy and firewall.

Figure 11:
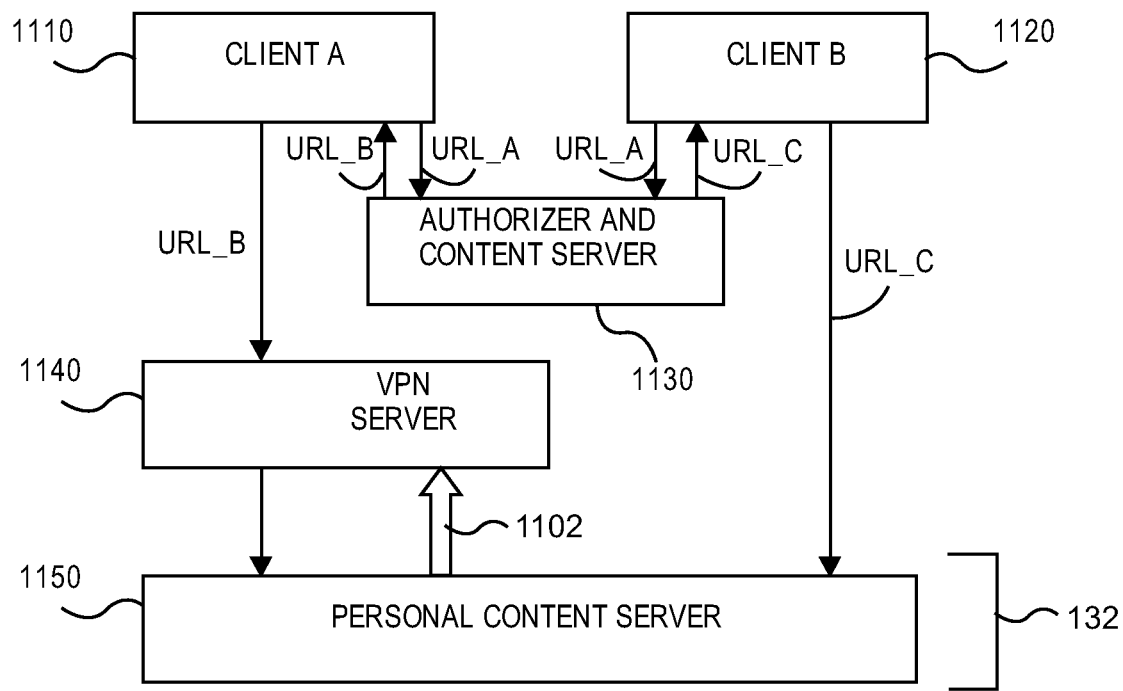
FIG. 11 is a schematic block diagram of the network environment with HTTP connections inside and outside of a VPN tunnel, managed in accordance with an embodiment of the present invention.

FIG. 11 illustrates a network environment with HTTP connections inside and outside of a VPN tunnel 1102, managed in accordance with an embodiment of the present invention. In this embodiment, plurality of client devices 1110, 1120 receives a network identifier (URL_A) of the content stored on the server 1130, having an authorizer module executing thereon. In other embodiments, authorizer and content server may be located on separate physical devices, exchanging information over the computer network. Content stored on the server 1130 has one or more pointers to the protected content provide by the Personal Content Server 1150 (for instance, content stored on the device 1150 inside the local network 132, or on a router connected to the local network 132). Personal Content Server 1150 establishes connection 1102 to the VPN server 1140, capable of passing external connection requests back to the personal content server 1150 through the VPN tunnel 1102. In addition to receiving connection requests through the VPN tunnel 1102, personal content server 1150 is also enabled to receive direct connection requests from external IP addresses (for instance, by accepting all incoming requests on port 443). In other embodiments, VPN server 1140 can be replaced by a proxy server, or other type of the server capable of establishing reverse connections.

In the illustrated embodiment, server 1130 returns different content to clients 1110 and 1120 depending on authorization results. For instance, client A (1110) receives URL_B, pointing to the VPN server 1140 and containing a reference to the personal content server 1150, while client B (1120) receives URL_C, directly pointing to the IP address of the personal content server 1150.

Providing the client 1110, 1120 with the direct IP of the personal content server 1150 is much less secure than providing it with the IP address of the VPN server 1140: a malicious client 1110, 1120 may probe for vulnerabilities of the server 1150, or execute denial of service (DoS) attacks. On the other side, direct access to the Personal Server 1150 could be faster that through the VPN server 1140, especially if the client 1120 and server 1150 are much closer to each other than the client 1120 and VPN server 1140. Accordingly to the present invention, only clients with sufficient authorization level (for instance, ones trusted by the owner of the personal content server 1150 and proving their identity by login and password) are allowed to connect directly. Other registered clients are sent through the VPN server 1140. In another example, the authorizer may request a two-factor authentication (for instance, sending a message to a mobile phone) to allow direct access, while pointing clients with less secure authentication to the VPN server 1140. In another example, server 1130 allows direct access to all clients that provide valid login and password, while pointing unrecognized clients to the VPN server 1140.

In some embodiments, content server 1130 returns different HTML content to clients with different authorization levels, containing either URL_B (referring to VPN server 1140 for a client 1110 with a lower authorization level) or URL_C (referring directly to content server 1150 for a client 1120 with a higher authorization level). In some embodiments, content server 1130 redirects client to URL_B or URL_C by using HTTP redirection headers.

Figure 12:
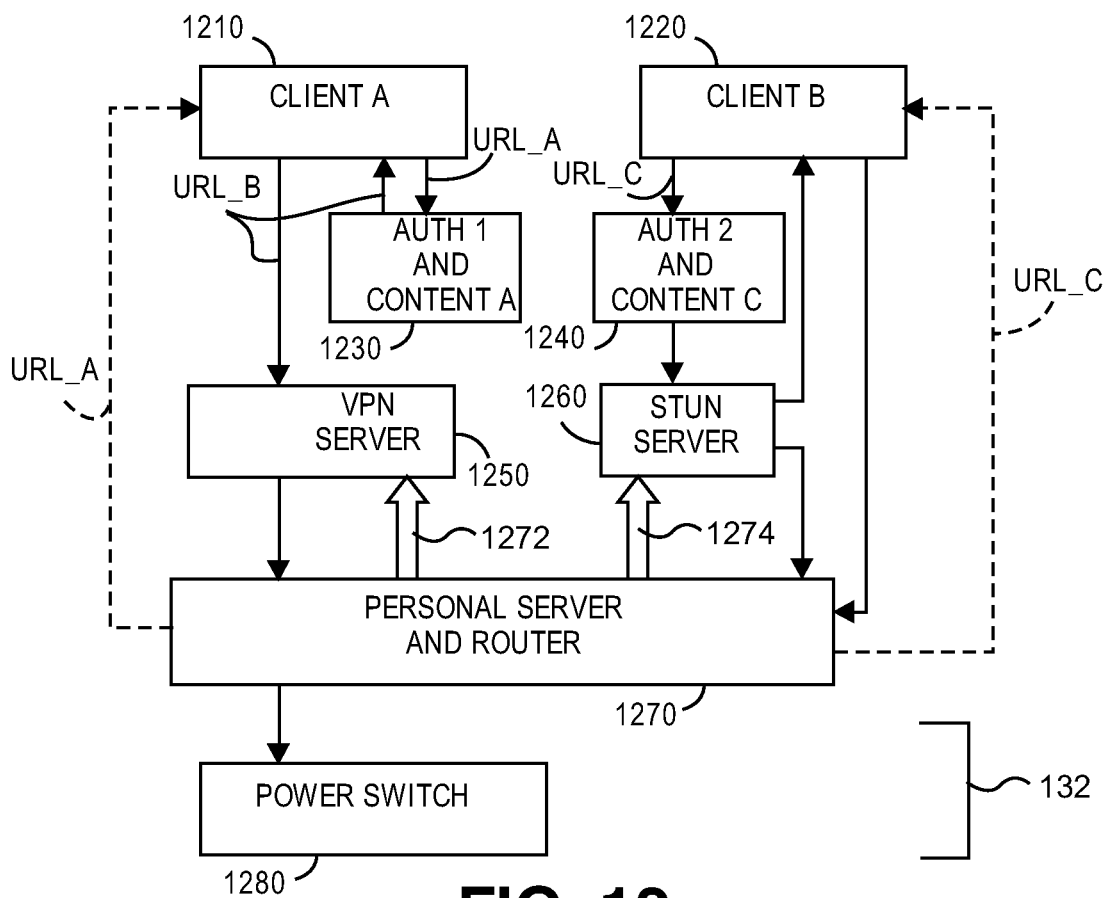
FIG. 12 is a schematic block diagram of the network environment with connections using different communication frameworks, managed in accordance with an embodiment of the present invention.

FIG. 12 illustrates the network environment with connections using different communication frameworks, managed in accordance with an embodiment of the present invention. In this embodiment, different clients 1210 and 1220 receive pointers to the different content servers 1230 and 1240 outside of the local network 1232. For instance, personal server 1270 sends URL_A to client A (1210) and URL_C to client B (1220), using email addresses of the corresponding clients. In this example, URL_A is intended for control of the less secure device inside the local network (power switch 1280). In contrast, URL_C is intended to request content from the more secure personal server 1270, for instance one combined with a router. Personal server 1270 opens connection 1272 to the VPN server 1250, enabled to provide reverse connections for external HTTP requests, and also establishes connection 1274 to the STUN (session traversal of user datagram protocol (UDP) through network address translators (NAT)) server 1260, enabled to support direct connections accordingly to Interactive Connectivity Establishment (ICE) framework (for instance, by using WebRTC (web real time communication) protocol).

In the illustrated embodiment, requests from client A (1210) and client B (1220) are processed by different content servers 1230 and 1240 and different authorizers associated with these servers. In another embodiment, both clients 1210, 1220 may use the same content server supporting multiple types of URL requests, or the same authorizer. In this example, authorized client A (1210) submits requests for URL_A and receives URL_B, pointing to VPN server 1250 programmed to forward that HTTP request to the personal server 1270, which is programmed to pass it to the device 1280. In this way, access to the less secure device 1280 is protected from unauthorized clients, especially if URL_B is a one-time URL that can't be reused for repeated access without additional authorization through the server 1230.

Authorized client B (1220), after submitting URL_C to the server 1240, receives information from the STUN server 1260 that allows it to establish direct connection with personal server 1270, for instance by using WebRTC protocol. In the illustrated embodiment, server 1240 informs STUN server 1260 that client B (1220) is allowed to directly connect to the Personal Server 1270. In response, the STUN server 1260 will then permit connection requests from client 1220 by passing them on to the personal server 1270. In another embodiment, server 1240 may send a content to the client B (1220) (such as one-time URL) that permits client B (1220) to connect to the STUN server 1260 and receive IP address of the Personal Server 1270. As a result, client B is permitted by the stun server 1260 direct access to the files stored on the more secure personal server 1270 (with knowledge of the personal server's 1270 IP address), while client A will only have access to the less secure device 1280 through the VPN server 1250, without receiving the IP address of the personal server 1270.

Figure 13:
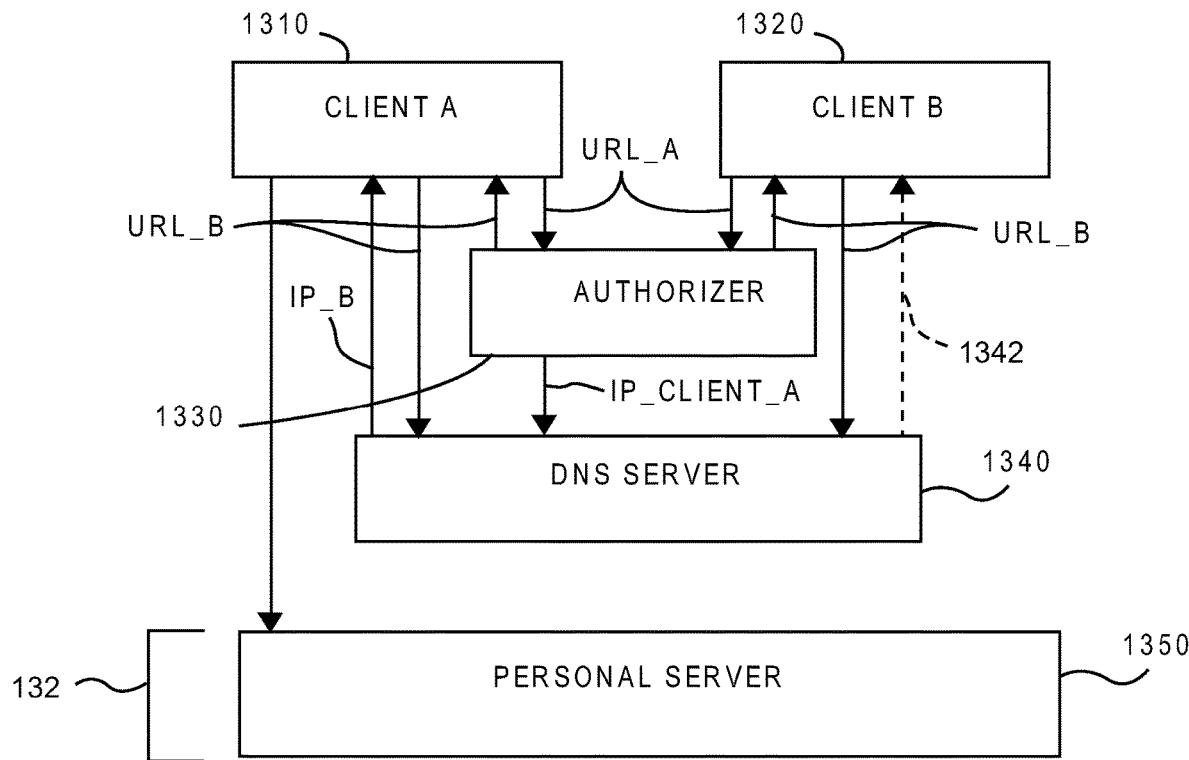
FIG. 13 is a schematic block diagram of the network environment with connections controlled by a DNS server, managed in accordance with an embodiment of the present invention.

FIG. 13 illustrates a network environment with connections controlled by a DNS server 1340, managed in accordance with an embodiment of the present invention. In this embodiment, clients A and B (1310 and 1320) submit requests for content referenced by the same URL_A to the server 1330 and receive the same URL_B (either inside HTML content or as a redirection), URL_B having domain that needs to be resolved to an IP address by the Domain Name Server (DNS server) 1340. Authorizer, which is connected to the server 1330 or is implemented as a module residing on the server 1330, determines that client A (1310) is authorized (for instance, it has submitted correct login and password, or secure session cookie), while client B is not (for instance, its password was incorrect). According to the present invention, server 1330 informs DNS server 1340 that DNS request with source IP address of the client A (1310) is authorized to receive the IP address of the personal server 1350. If Time To Live (TTL) of the DNS record corresponding to the domain of URL_B is low (for instance, 1s), DNS responses submitted after the interval TTL are not cached. The DNS server 1340 receives a request from the client A (1310), determines that its source IP address is authorized and resolves domain of URL_B to the IP address (IP_B) of the personal server 1350. If a DNS request for the same domain was received from the client B (1320), which wasn't authorized by the server 1330, DNS server 1340 returns "server not found" error code 1342, instead of providing IP address of the personal server 1350.

In another embodiment, DNS server may return an IP address of a VPN server or a proxy server enabled to pass external requests to the personal server 1350, instead of returning an error 1342. Instead of relying only on authorization status provided by the server 1330, DNS server may have its own set of rules that combine a client's 1310, 1320 authorization status with other parameters. For instance, DNS servers 1340 may allow unauthorized clients to connect to the personal server 1350 if their source IP indicates close proximity with the personal server 1350 (for instance, same city or ZIP code), or may forbid connection from authorized clients if their source IP points to a different country. In this way, rules controlling access to the personal server 1350 can be spread between different servers, for instance ones belonging to different business entities.

Figure 14:
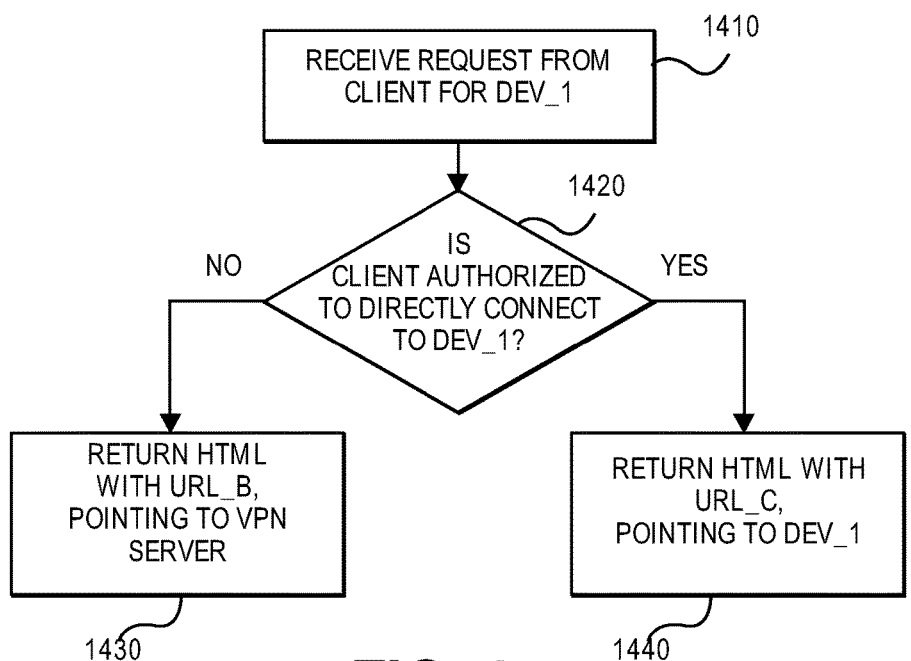
FIG. 14 is a process flow diagram for a method of for managing connection routes between computer devices, in accordance with an embodiment of the present invention.

FIG. 14 illustrates a method for managing connection routes between computer devices, in accordance with an embodiment of the present invention. After receiving a request from the client 1210, 1220 (step 1410) to connect to a specific device (dev_1) in the local network 132 by the authorizer 1230, 1240, the authorizer 1230, 1240 determines whether the client 1210, 1220 is authorized to directly connect to dev_1 (step 1420). If the client 1210, 1220 is determined not to be authorized to have direct access, the authorizer 1230, 1340 provides the client 1210, 1220 with URL_B, having a domain pointing to a VPN server 1250 capable of passing the request to dev_1 (step 1430). If the client's 1210, 1220 authorization is confirmed, the client 1210, 1220 receives URL_C, having domain pointing directly to dev_1 (step 1440).

Figure 15:
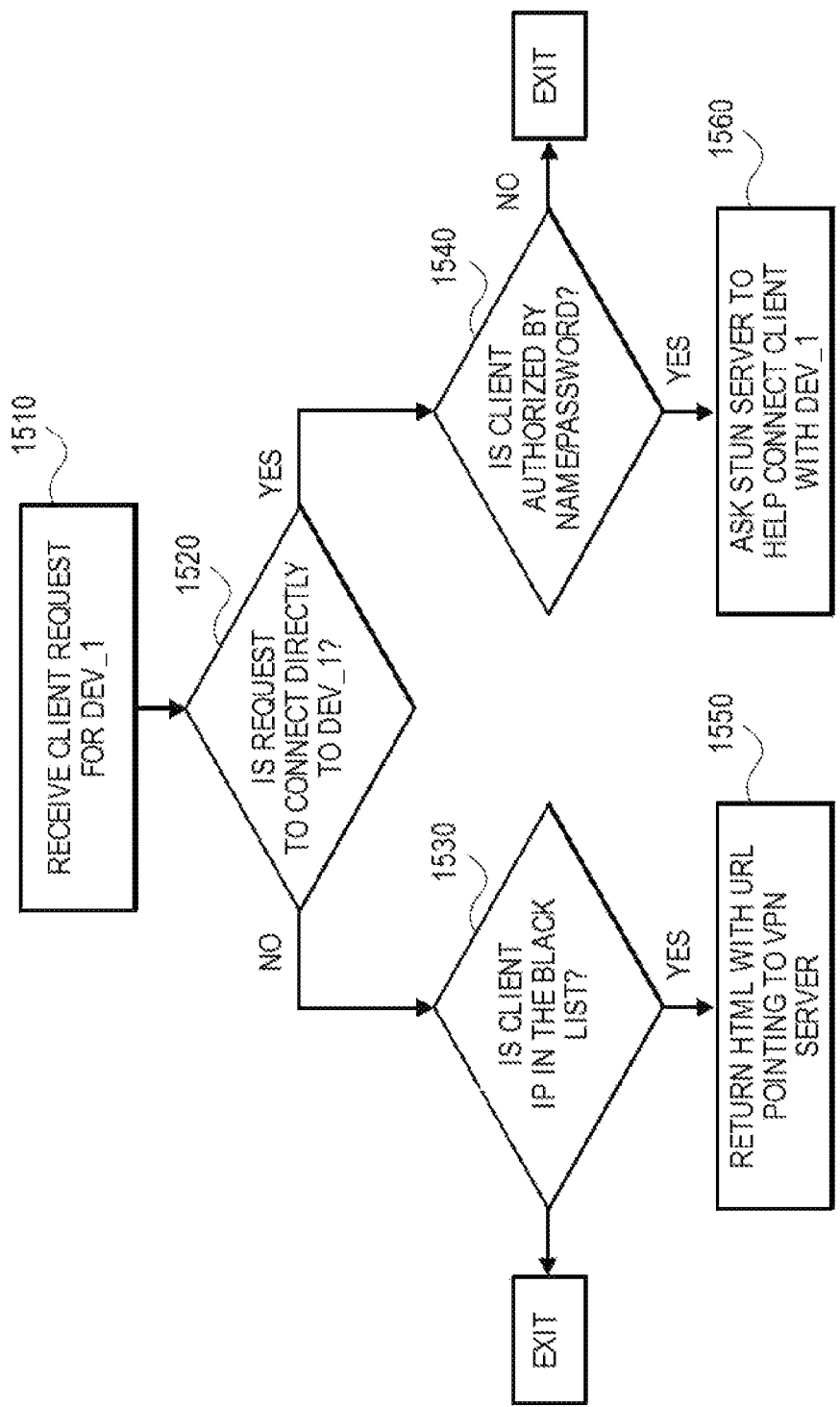
FIG. 15 is a process flow diagram for a method of for managing connection routes between computer devices depending on the initial connection request, in accordance with an embodiment of the present invention.

FIG. 15 illustrates a method of for managing connection routes between computer devices depending on the initial connection request, in accordance with an embodiment of the present invention. After receiving a request from a client 1210, 1220 to connect to dev_1 in the local network 132 (step 1510), the authorizer 1230, 1240 determines if the request is to connect to the dev_1 directly, or through as an intermediary such as a VPN 1250 or a proxy (step 1520). Such a determination may depend, for instance, in part on the requested URL such as a domain, path or file name. If the client 1210, 1220 requests to connect through a VPN server, 1250 without requesting a real IP address of dev_1, the authorizer 1230, 1240 performs only limited request validation, for instance by checking that the source IP address of the client 1210, 1220 is not in a blacklist (step 1530) and returns a URL pointing to the VPN server 1250 if no match with black list was found (step 1550). If client 1210, 1220 requests to connect to dev_1 directly, more stringent validation is performed: for instance, the client 1210, 1220 is requested to provide a user name and password (step 1540), and is provided by the authorizer 1230, 1240 the real IP address of the dev_1 from the STUN server 1260 (step 1560) only if the login is determined to be valid.

In other embodiments, clients 1210, 1220 requesting access through an intermediary may skip validation checks or use different checks such as by having IP address that was previously authorized for direct access, or using a time-sensitive URL before it has expired. Clients 1210, 1220 requesting direct access to dev_1 may use validation checks such as certificate exchange. A client 1210, 1220 may be allowed to connect if a total number of simultaneous connections to dev_1 is within an allowed limit. A client 1210, 1220 may be allowed to connect if it has an IP address from an allowed geographic location. In some embodiments, clients 1210, 1220 requesting direct access to dev_1 are subjected to more stringent checks than clients 1210, 1220 requesting access to dev_1 through an intermediary such as VPN server 1250. In some embodiments, clients 1210, 1220 requesting any type of access are required to perform the same login procedures, but direct access is only allowed to clients having additional pre-defined properties, such as user names matching the white list provided by the owner of the dev_1.

Figure 16:
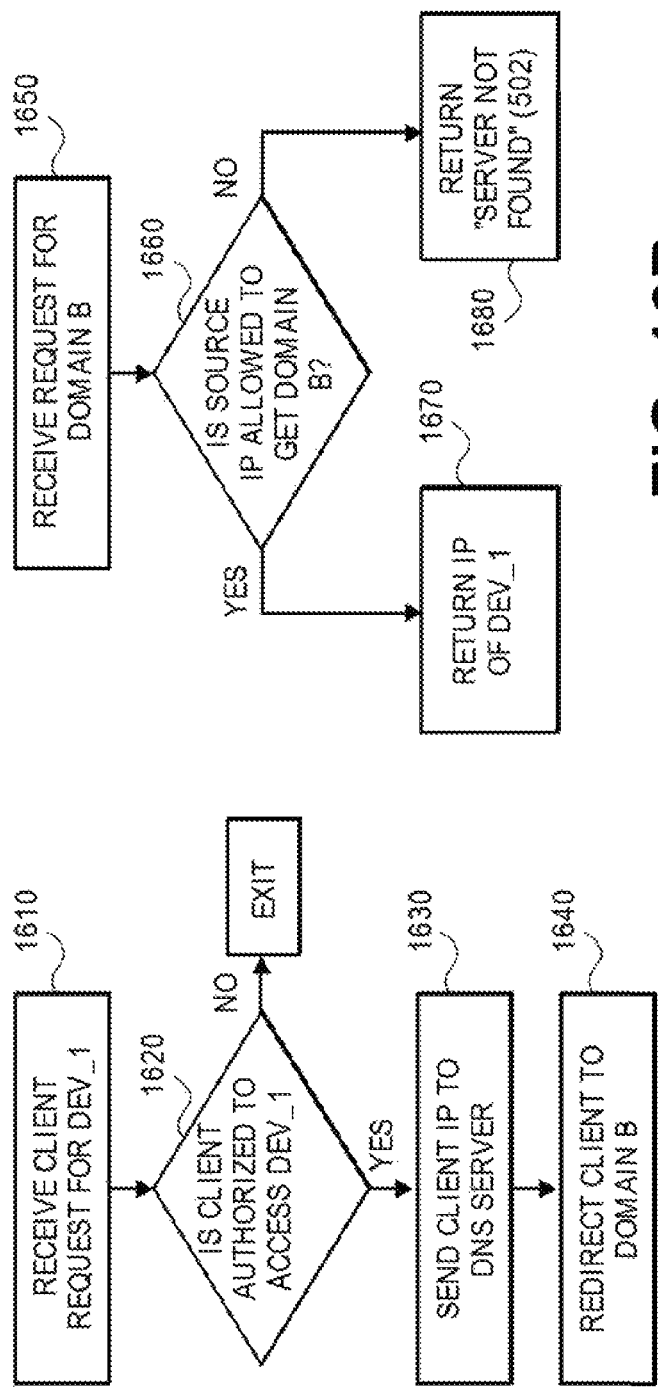
FIGS. 16A and 16B are process flow diagrams for a method of for managing connections between computer devices by DNS server, in accordance with an embodiment of the present invention.

FIGS. 16A and 16B illustrate a method of for managing connections between computer devices by DNS server, in accordance with an embodiment of the present invention.

Referring to FIG. 16A, an authorizer 1330, after receiving a request from the client 1310, 1320 to connect to dev_1, such as personal server 1350 (step 1610), determines if the client is authorized to access dev_1 according to pre-specified rules of the authorizer 1330 (step 1620). If so, the authorizer 1330 sends the client's 1320, 1320 source IP address to a DNS server 1340 programmed to resolve a domain B pointing to dev_1 (step 1630), and then redirects the client 1310, 1320 step to a URL containing domain B (1640).

Referring to FIG. 16b, DNS server 1340, after receiving a request from the client 1310, 1320 to resolve the domain B (step 1650), determines whether the source IP associated with the DNS request is permitted according to rules accessed by the server 1340 to get an IP address for the domain B, which points directly to dev_1 (step 1660). In some embodiments, this decision depends both on a signal from authorizer 1330 and on one or more additional parameters, such as a geographic location of the client's source IP. In the illustrated embodiment, clients 1310 with allowed source IPs receive the IP address IP_B of dev_1 (step 1670), while other clients 1320 receive an error code 1342 (step 1680). In another embodiment, clients 1320 that have source IPs which are not allowed to directly access dev_1 according to rules accessed by the authorizer 1330 and/or DNS server 1340 may receive an IP address pointing to an intermediary server such as VPN server, or receive a CNAME (canonical name record) response from DNS server 1340 pointing to a domain referencing an intermediary server.

In some embodiments, clients 1310, 1320 with different authorization levels may be allowed to issue different sets of commands to a protected device 1350, such as a personal server or a device within the local network 132. For instance, a trusted user with a high authorization level may be allowed to issue large variety of commands to a power switch, with or without an intermediary proxy, for instance requesting historical data about energy consumption. In contrast, a user with lower authorization level may only be allowed to issue commands defined by a User Interface (UI) presented by an external server, the router or the protected device (for instance, a UI only allowing such a user to turn the switch On or Off).

Security and privacy of direct access can be further improved by enabling encrypted data exchange between two devices using one or more keys not known to other servers on the computer network. In some embodiments, at least one the connecting parties (for instance, a client 1310, 1320 intending to establish direct access to the personal server 1350) authenticates another server on the computer network (for instance, by using TLS protocol), and then both parties receive key material (for instance, symmetric key) that can be used to establish direct encrypted connections. This key material is known to at least one other server on the computer network (for instance, an authorizer 1330), but connecting parties use it only to establish their own shared symmetric key (for instance, by using Diffie-Hellman protocol for the key exchange). This key is hidden from the other computers, such as the authorizer 1330, and can be used for a private and secure data exchange between connected parties. To prevent snooping on the initial Diffie-Hellman exchange, connecting parties may establish it through the alternative communication channels, such as emails, mobile messages or posts on the sites that allow user's content (image galleries, social networks etc.). In one implementation of this embodiment, connecting parties use WebRTC protocol, and one or more key materials used for the Diffie-Hellman key exchange are returned by the signaling server.

Figure 17:
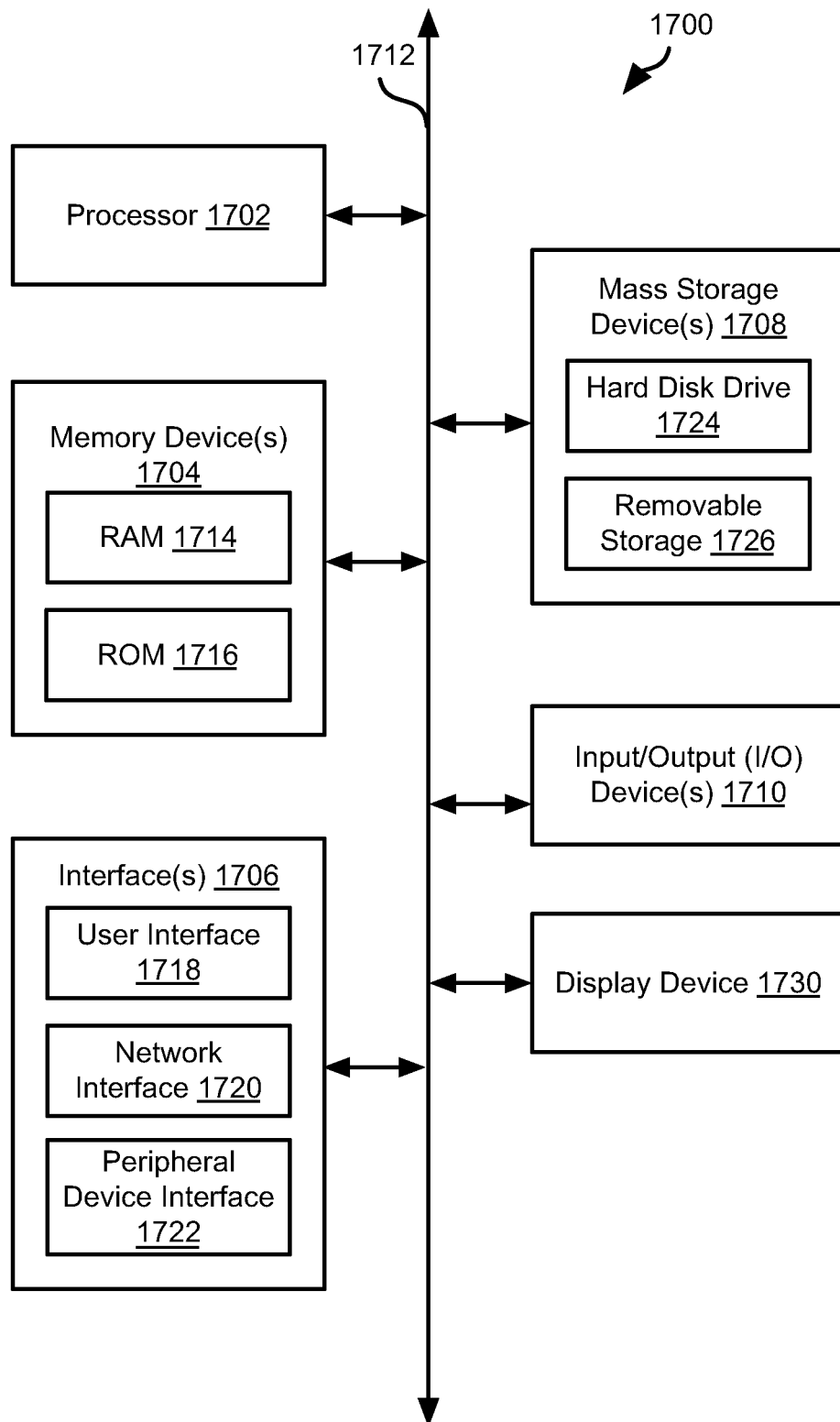
FIG. 17 is a schematic block diagram of a computer suitable for implementing the systems and methods disclosed herein.

FIG. 17 is a block diagram illustrating an example computing device 1700 which may embody any of the computers and servers disclosed herein. Computing device 1700 may be used to perform various procedures, such as those discussed herein. Computing device 1700 can function as a server, a client, or any other computing entity. Computing device can perform various monitoring functions as discussed herein, and can execute one or more application programs, such as the application programs described herein. Computing device 1700 can be any of a wide variety of computing devices, such as a desktop computer, a notebook computer, a server computer, a handheld computer, tablet computer and the like.

Computing device 1700 includes one or more processor(s) 1702, one or more memory device(s) 1704, one or more interface(s) 1706, one or more mass storage device(s) 1708, one or more Input/Output (I/O) device(s) 1710, and a display device 1730 all of which are coupled to a bus 1712. Processor(s) 1702 include one or more processors or controllers that execute instructions stored in memory device(s) 1704 and/or mass storage device(s) 1708. Processor(s) 1702 may also include various types of computer-readable media, such as cache memory.

Memory device(s) 1704 include various computer-readable media, such as volatile memory (e.g., random access memory (RAM) 1714) and/or nonvolatile memory (e.g., read-only memory (ROM) 1716). Memory device(s) 1704 may also include rewritable ROM, such as Flash memory.

Mass storage device(s) 1708 include various computer readable media, such as magnetic tapes, magnetic disks, optical disks, solid-state memory (e.g., Flash memory), and so forth. As shown in FIG. 17, a particular mass storage device is a hard disk drive 1724. Various drives may also be included in mass storage device(s) 1708 to enable reading from and/or writing to the various computer readable media. Mass storage device(s) 1708 include removable media 1726 and/or non-removable media.

I/O device(s) 1710 include various devices that allow data and/or other information to be input to or retrieved from computing device 1700. Example I/O device(s) 1710 include cursor control devices, keyboards, keypads, microphones, monitors or other display devices, speakers, printers, network interface cards, modems, lenses, CCDs or other image capture devices, and the like.

Display device 1730 includes any type of device capable of displaying information to one or more users of computing device 1700. Examples of display device 1730 include a monitor, display terminal, video projection device, and the like.

Interface(s) 1706 include various interfaces that allow computing device 1700 to interact with other systems, devices, or computing environments. Example interface(s) 1706 include any number of different network interfaces 1720, such as interfaces to local area networks (LANs), wide area networks (WANs), wireless networks, and the Internet. Other interface(s) include user interface 1718 and peripheral device interface 1722. The interface(s) 1706 may also include one or more user interface elements 1718. The interface(s) 1706 may also include one or more peripheral interfaces such as interfaces for printers, pointing devices (mice, track pad, etc.), keyboards, and the like.

Bus 1712 allows processor(s) 1702, memory device(s) 1704, interface(s) 1706, mass storage device(s) 1708, and I/O device(s) 1710 to communicate with one another, as well as other devices or components coupled to bus 1712. Bus 1712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1700, and are executed by processor(s) 1702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A system comprising:
a first computer having a non-transitory computer readable medium storing a computer program having computer executable instructions for causing the first computer to:
receive a request from a second computer to provide one or more first network identifiers for establishing a data connection to a third computer in an external network, wherein the first computer and the second computer are coupled to the external network;
evaluate whether the second computer is authorized to initiate direct inbound connections to the third computer;
in accordance with the second computer being authorized to initiate direct inbound connections to the third computer, provide to the second computer the one or more first network identifiers;
in accordance with the second computer not being authorized to initiate direct inbound connections to the third computer, provide to the second computer one or more second network identifiers for establishing a data connection to a fourth computer that forwards traffic to the third computer via a connection with the third computer without transmitting the one or more first network identifiers to the second computer.

2. The system of claim 1, wherein the one or more first network identifiers are selected from the group consisting of a destination IP address and a destination port for the inbound connections to the third computer.

3. The system of claim 1, wherein the computer program further includes computer executable instructions for causing the first computer to evaluate whether the second computer is authorized to initiate direct inbound connection to the third computer by requesting the second computer to provide authorization credentials.

4. The system of claim 1, further comprising the fourth computer, wherein the fourth computer is programmed to establish an outbound connection from the third computer to the fourth computer before providing the one or more second network identifiers to the second computer, the outbound connection from the third computer to the fourth computer being a reverse connection to the third computer.

5. The system of claim 4, wherein the fourth computer is programmed to execute a virtual private network (VPN) server enabled to support reverse connections inside a VPN tunnel established from the third computer to the fourth computer.

6. The system of claim 1 further comprising the second computer, wherein the second computer is programmed to, if the second computer is authorized to initiate direct inbound connections to the third computer, initiate the direct inbound connections to the third computer using interactive connectivity establishment (ICE) framework over user datagram protocol (UDP);

wherein the second computer is programmed to, if the second computer is not authorized to initiate direct inbound connections to the third computer, initiate a connection between the second computer and the fourth computer using hypertext transfer protocol (HTTP).

7. The system of claim 1, wherein the computer program further includes computer executable instructions for causing the first computer to execute a domain name server (DNS) and to provide to the second computer with at least one of the one or more first network identifiers and the one or more fourth network identifiers in response to a domain resolution request from the second computer.

8. The system of claim 1, wherein the third computer is a network-enabled home appliance.

9. The system of claim 1, wherein the third computer comprises at least one of a gateway, a router, a bridge, a switch and a firewall.

10. A method comprising:
(a) receiving at a first device a request from a second device for an access to a third device;
(b) evaluating, by the first device, whether the second device is allowed to directly access the third device;
(c) after performing (b), in accordance with the second device being allowed to directly access the third device, providing, by the first device, the second device with one or more network identifiers of the third device, thereby enabling the second device to connect to the third device while bypassing the first device; and
(d) after performing (b), in accordance with the second device not being allowed to directly access the third device, providing the second device with one more network identifiers enabling the second device to connect to the third device through a fourth device using a connection between the third device and the fourth device, thereby enabling the second device to connect to the third device without using the one or more network identifiers of the third device.

11. The method of claim 10, wherein the first connection uses using hypertext transfer protocol (HTTP).

12. The method of claim 10, executing, by the fourth device, a virtual private network (VPN) server enabled to support reverse connections inside a VPN tunnel established from the third device to the fourth device.

13. The method of claim 10, wherein the one or more network identifiers of the third device are selected from the group consisting of a destination IP address and a destination port for a direct inbound connection to the third device.

14. The method of claim 10, where evaluating whether the second device is allowed to directly access the third device comprises requesting the second device to provide authorization credentials.

15. The method of claim 10, further comprising, when the second device is determined to be allowed to directly access the third device, initiating, by the second device, a direct inbound connections to the third device using interactive connectivity establishment (ICE) framework over user datagram protocol (UDP).

16. The method of claim 10, wherein the first device comprises a domain name server (DNS);
wherein providing, by the first device, to the second device the one or more first network identifiers is performed in response to receiving a domain resolution request from the second device.

17. A first computer having a non-transitory computer readable medium storing a computer program having computer executable instructions for causing a first computer to:
receive a request from a second computer to provide one or more first network identifiers for establishing a data connection to a third computer in an external network, wherein the first computer and the second computer are coupled to the external network;
evaluate whether the second computer is authorized to initiate direct inbound connections to the third computer;
in accordance with the second computer being authorized to initiate direct inbound connections to the third computer, provide to the second computer the one or more first network identifiers;
in accordance with the second computer not being authorized to initiate direct inbound connections to the third computer, provide to the second computer, one or more second network identifiers for establishing a data connection to a fourth computer that forwards traffic to the third computer via a connection with the third computer without transmitting the one or more first network identifiers to the second computer.

18. The non-transitory computer readable medium of claim 17, wherein the one or more first network identifiers are selected from the group consisting of a destination IP address and a destination port for the inbound connections to the third computer.

19. The non-transitory computer readable medium of claim 17, wherein the computer program further includes computer executable instructions for causing the first computer to evaluate whether the second computer is authorized to initiate direct inbound connection to the third computer by requesting the second computer to provide authorization credentials.

20. The non-transitory computer readable medium of claim 17, wherein the computer program further includes computer executable instructions for causing the first computer to execute a domain name server (DNS) and to provide to the second computer at least one of the one or more first network identifiers and the one or more fourth network identifiers in response to a domain resolution request from the second computer.

* * * * *